US011010112B2

(12) United States Patent
Ikeda et al.

(10) Patent No.: US 11,010,112 B2
(45) Date of Patent: May 18, 2021

(54) IMAGE PROCESSING APPARATUS FOR DISPLAYING USER MESSAGE AND METHOD CONTROLLING THE SAME

(71) Applicant: CANON KABUSHIKI KAISHA, Tokyo (JP)

(72) Inventors: Toru Ikeda, Abiko (JP); Seiya Omori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/017,378

(22) Filed: Jun. 25, 2018

(65) Prior Publication Data
US 2019/0004751 A1    Jan. 3, 2019

(30) Foreign Application Priority Data

Jun. 29, 2017 (JP) .............................. JP2017-128045
Mar. 15, 2018 (JP) .............................. JP2018-048250

(51) Int. Cl.
*G06F 3/12* (2006.01)
*H04N 21/475* (2011.01)
*H04N 21/485* (2011.01)
*H04N 21/488* (2011.01)
*G06F 3/0482* (2013.01)
*G06F 3/0484* (2013.01)
*H04N 1/00* (2006.01)

(52) U.S. Cl.
CPC .......... *G06F 3/1238* (2013.01); *G06F 3/0482* (2013.01); *G06F 3/04842* (2013.01); *G06F 3/1286* (2013.01); *H04N 1/00427* (2013.01); *H04N 21/4753* (2013.01); *H04N 21/485* (2013.01); *H04N 21/4882* (2013.01)

(58) Field of Classification Search
None
See application file for complete search history.

(56) References Cited

U.S. PATENT DOCUMENTS

2011/0102841 A1*  5/2011  Morita ............... H04N 1/00411
                                                358/1.15
2012/0047024 A1*  2/2012  Urban .................... G06Q 20/10
                                                705/14.69
(Continued)

FOREIGN PATENT DOCUMENTS

CN        102299955 A      12/2011
CN        103873136 A      6/2014
(Continued)

*Primary Examiner* — Andrew H Lam
(74) *Attorney, Agent, or Firm* — Canon U.S.A., Inc. IP Division

(57) ABSTRACT

An image processing apparatus includes a registration unit configured to register a content to be displayed on a display unit of the image processing apparatus, a setting unit configured to make a setting as to whether to display, in accordance with a login to the image processing apparatus, the content registered by the registration unit, and a display control unit configured to control, in a case where the setting unit makes the setting to display, in accordance with the login to the image processing apparatus, the content registered by the registration unit, processing of displaying, on the display unit in accordance with a user login, the content registered by the registration unit.

10 Claims, 19 Drawing Sheets

(56) References Cited

U.S. PATENT DOCUMENTS

2016/0295034 A1* 10/2016 Miyazawa ......... H04N 1/00411
2017/0094121 A1* 3/2017 Mizuno ................... G06F 21/45
2017/0331965 A1* 11/2017 Ikeda ................. H04N 1/00464

FOREIGN PATENT DOCUMENTS

| EP | 2400445 A2 | 12/2011 |
| JP | 2016-218706 A | 12/2016 |
| JP | 2017049821 A | 3/2017 |
| KR | 2011-0015382 A | 2/2011 |
| KR | 2012-0074222 A | 7/2012 |

* cited by examiner

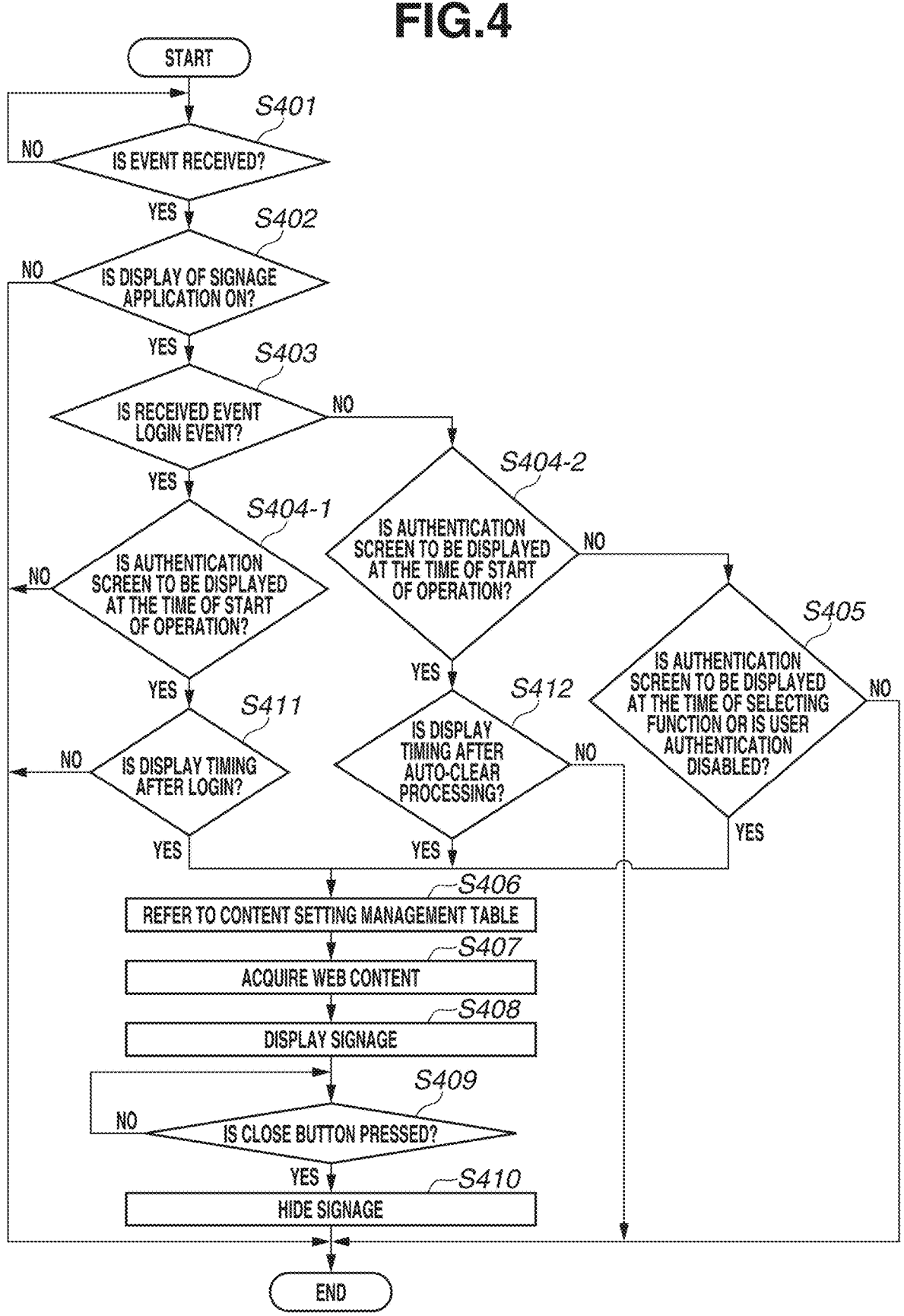

FIG.5-1A

LOG IN

USER NAME: Admin
PASSWORD: •••••
DEVICE TO LOG IN: CURRENT DEVICE ˅
INPUT USER NAME AND PASSWORD, DESIGNATE DEVICE TO LOG IN, AND CLICK [LOG IN].

[ LOG IN ]

FIG.5-1B

SETTINGS/REGISTRATION      TO PORTAL  LOGGED-IN USER: Admin  LOG OUT

PREFERENCES
  SHEET SETTINGS
  TIMER/ENERGY SETTINGS
  NETWORK
  EXTERNAL INTERFACE
  VOLUME ADJUSTMENT
ADJUSTMENT/MAINTENANCE
  IMAGE QUALITY ADJUSTMENT
FUNCTION SETTINGS
  COMMON
  COPY
  PRINTER
  STORE/ACCESS FILES
MANAGEMENT SETTINGS
  USER MANAGEMENT
  DEVICE MANAGEMENT
  LICENSE/OTHER
  DATA MANAGEMENT
  SECURITY SETTINGS

SETTINGS/REGISTRATION: PREFERENCES: SHEET SETTINGS
PREFERENCES: SHEET SETTINGS
  SHEET SETTINGS
  SHEET TYPE MANAGEMENT SETTINGS

| SETTINGS/REGISTRATION | TO PORTAL  LOGGED-IN USER: Admin  LOG OUT |
|---|---|
| PREFERENCES<br>  SHEET SETTINGS<br>  TIMER/ENERGY SETTINGS<br>  NETWORK<br>  EXTERNAL INTERFACE<br>  VOLUME ADJUSTMENT<br>ADJUSTMENT/MAINTENANCE<br>  IMAGE QUALITY ADJUSTMENT<br>FUNCTION SETTINGS<br>  COMMON<br>  COPY<br>  PRINTER<br>  STORE/ACCESS FILES<br>MANAGEMENT SETTINGS<br>  USER MANAGEMENT<br>  DEVICE MANAGEMENT<br>  LICENSE/OTHER<br>  DATA MANAGEMENT<br>  SECURITY SETTINGS | SETTINGS/REGISTRATION: MANAGEMENT SETTINGS: LICENSE/OTHER<br>MANAGEMENT SETTINGS: LICENSE/OTHER<br>  MESSAGE BOARD/SUPPORT LINK<br>  SIGNAGE ~502<br>  REMOTE UI SETTINGS<br>  REGISTER/UPDATE SOFTWARE |

FIG.5-2B

| SETTINGS/REGISTRATION | TO PORTAL  LOGGED-IN USER: guest  LOG OUT |
|---|---|
| PREFERENCES<br>  SHEET SETTINGS<br>  TIMER/ENERGY SETTINGS<br>  NETWORK<br>  VOLUME ADJUSTMENT<br>ADJUSTMENT/MAINTENANCE<br>  IMAGE QUALITY ADJUSTMENT<br>FUNCTION SETTINGS<br>  COMMON<br>  PRINTER<br>  STORE/ACCESS FILES<br>MANAGEMENT SETTINGS<br>  USER MANAGEMENT<br>  DEVICE MANAGEMENT | SETTINGS/REGISTRATION: PREFERENCES: SHEET SETTINGS<br>PREFERENCES: SHEET SETTINGS<br>  SHEET SETTINGS<br>  SHEET TYPE MANAGEMENT SETTINGS |

FIG.6

| key | value |
|---|---|
| signage_settings.signage_disp | 1 |
| signage_settings.signage_protocol | 1 |
| signage_settings.signage_smb_adrs | \guest_smb\share\image.jpg |
| signage_settings.signage_smb_user | guest |
| signage_settings.signage_smb_passwd | guest |
| signage_settings.signage_webdav_adrs | https://guest_webdav/signage.html |
| signage_settings.signage_webdav_user | user |
| signage_settings.signage_webdav_passwd | user |
| signage_settings.signage_webdav_cert | 1 |
| signage_settings.signage_webdav_cert_cn | 1 |
| signage_settings.signage_timing | 1 |

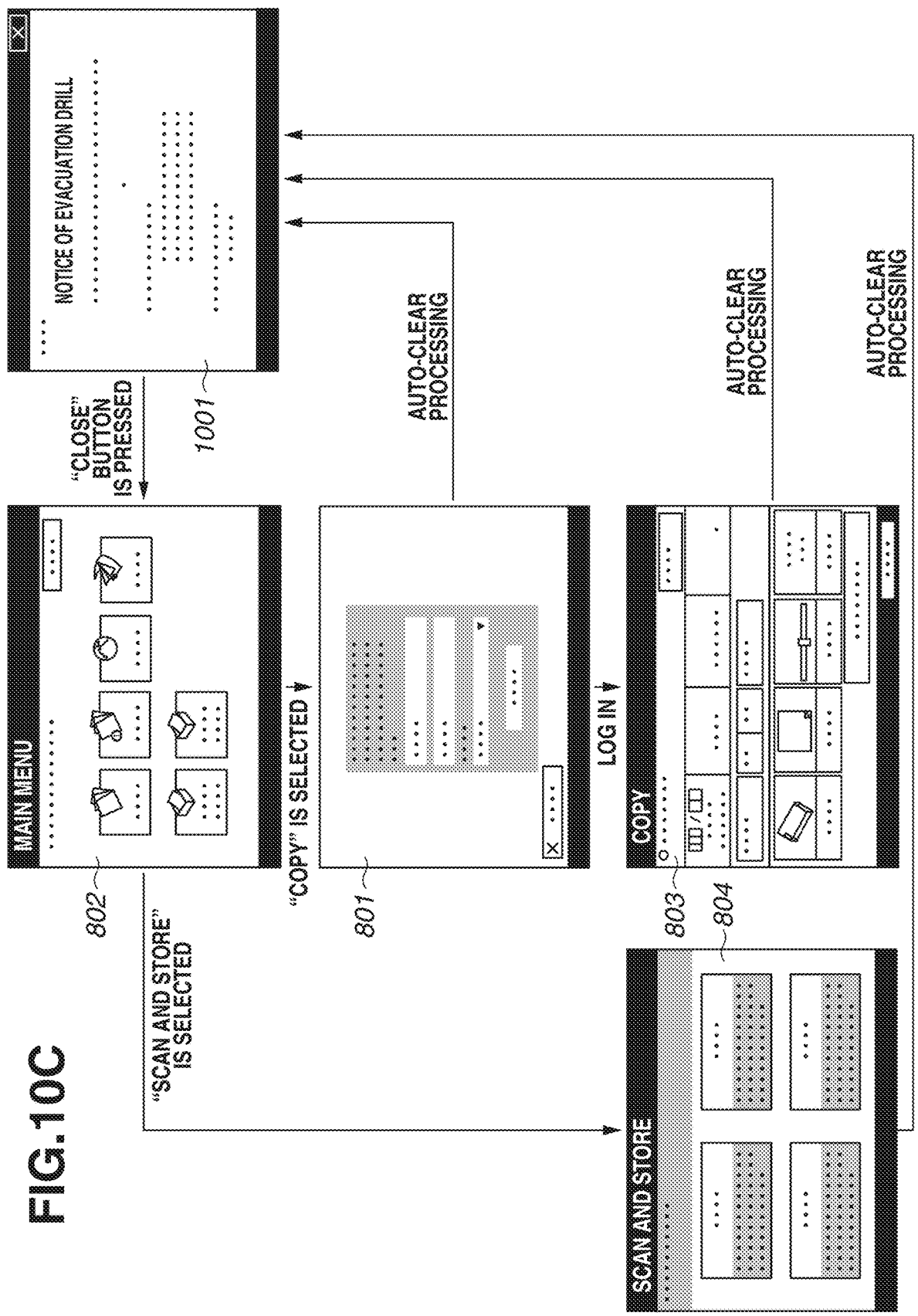

IMAGE PROCESSING APPARATUS FOR DISPLAYING USER MESSAGE AND METHOD CONTROLLING THE SAME

BACKGROUND

Field of the Disclosure

The present disclosure relates to an image processing apparatus, and a method for controlling the image processing apparatus.

Description of the Related Art

In recent years, "digital signage" has been increasingly used. The digital signage presents information in various places such as outdoors, shops, public spaces, and public transportation using displays connected to a network. Further, use of digital signage in offices of companies, etc. to assist employees in sharing information and assist the companies to control information is drawn attentions.

In the fields of image processing apparatuses such as multi-function peripherals, there are known techniques which acquire content from content distribution apparatuses connected via a network and display the content on an operation unit of an image processing apparatus (see Japanese Patent Application Laid-Open No. 2016-218706).

SUMMARY

According to an aspect of the present invention, an image processing apparatus includes a registration unit configured to register a content to be displayed on a display unit of the image processing apparatus, a setting unit configured to make a setting as to whether to display the content registered by the registration unit in accordance with a login to the image processing apparatus, and a display control unit configured to control, in a case where the setting unit makes the setting to display, in response to the login to the image processing apparatus, the content registered by the registration unit, processing of displaying the content registered by the registration unit on the display unit in accordance with a user login.

Further features of the present invention will become apparent from the following description of exemplary embodiments with reference to the attached drawings.

BRIEF DESCRIPTION OF THE DRAWINGS

FIG. 4 is a flowchart illustrating a processing procedure of the image processing apparatus.

FIGS. 5-1A and 5-1B illustrate an example of a web content setting screen.

FIGS. 5-2A and 5-2B illustrate an example of a web content setting screen.

FIGS. 5-3A and 5-3B illustrate an example of a web content setting screen.

FIGS. 5-4A and 5-4B illustrate an example of a web content setting screen.

FIG. 6 illustrates an example of a content setting management table.

FIG. 10C illustrates a flow of screens displayed in a case where the display setting of the signage application is set to ON and the display setting of the authentication screen is set to display the authentication screen at the time of selecting a function.

DESCRIPTION OF THE EMBODIMENTS

Various exemplary embodiments of the present invention will be described below with reference to the drawings.

Image processing apparatuses such as multi-function peripherals are terminals used many times during a day, and more effective use of the image processing apparatuses as signage in offices is desired, and a system for presenting appropriate information to users at appropriate timings is demanded.

For example, many image processing apparatuses include a user authentication function to limit the use of the image processing apparatuses to limited users. When the user authentication function of an image processing apparatus is ON, a user attempting to use the image processing apparatus first inputs a user identification (ID) and a password of the user via an authentication screen, and if the user authentication and login are successfully completed, the user is allowed to use various functions of the image processing apparatus. On the other hand, when the user authentication function is OFF, an authentication screen is not displayed, and the user can use the various functions of the image processing apparatus without user authentication and login. In this way, the change of the screen to be displayed is changed depending on whether the user authentication function is ON or OFF, and appropriate timings for operating as signage also change. This also applies to not only the case of ON/OFF of the user authentication function but also cases where the user authentication function is ON but the timing to display the authentication screen differs.

According to an aspect of an exemplary embodiment of the present invention, an image processing apparatus capable of displaying web contents at appropriate timings based on the settings relating to user authentication is provided.

According to another aspect of an exemplary embodiment of the present invention, an apparatus configured to display contents at appropriate timings based on a user login or other events is provided.

Figure 1:
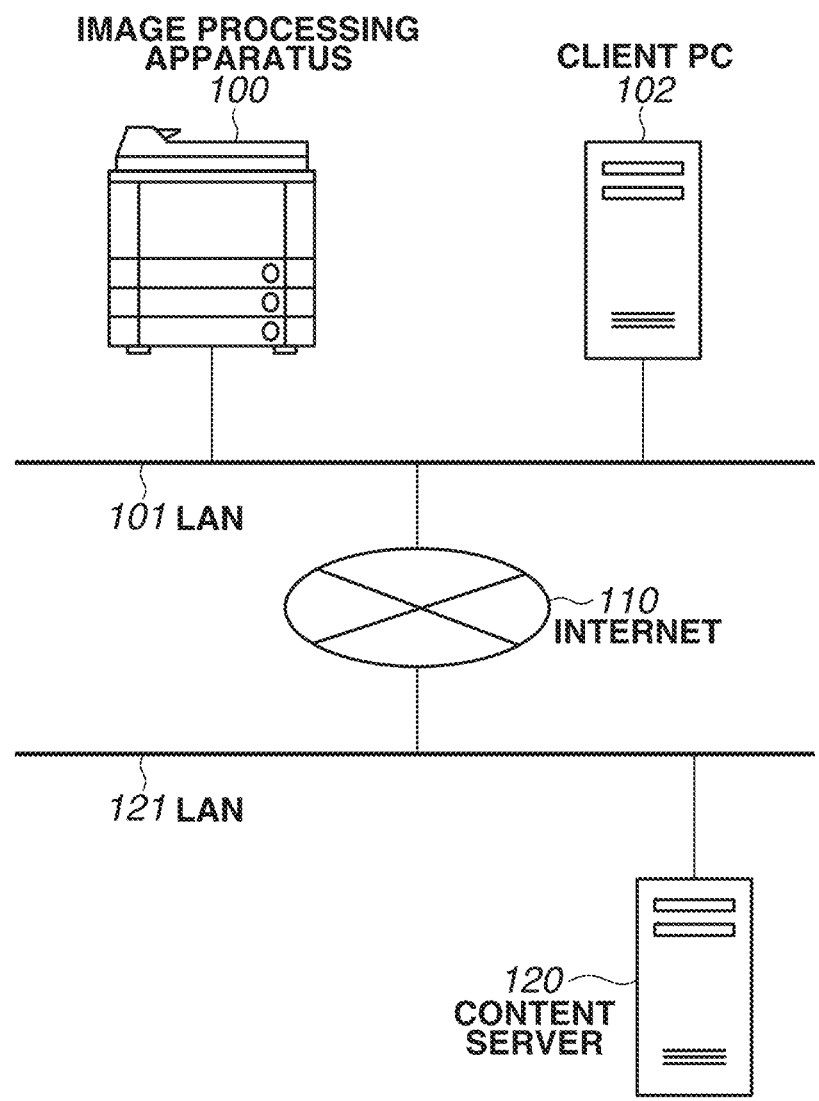
FIG. 1 is an entire view of a system.

FIG. 1 is an entire view of an image processing system according to an exemplary embodiment of the present invention. An image processing apparatus 100 is connected to an Internet 110 via a local area network (LAN) 101. A client personal computer (PC) 102 is connected to the image processing apparatus 100 via the LAN 101. A content server 120 stores various types of web contents and is connected to the Internet 110 via a LAN 121. The image processing apparatus 100 is capable of acquiring web contents described below from the content server 120 via the Internet 110. While a case where the system includes one image processing apparatus 100, one client PC 102, and one content server 120 is described in the present exemplary embodiment, the system may include a plurality of image processing apparatuses 100, a plurality of client PCs 102, and a plurality of content servers 120. Further, not the content server 120 but the image processing apparatus 100 may be configured to store web contents to internally acquire and display the web contents.

Figure 2:
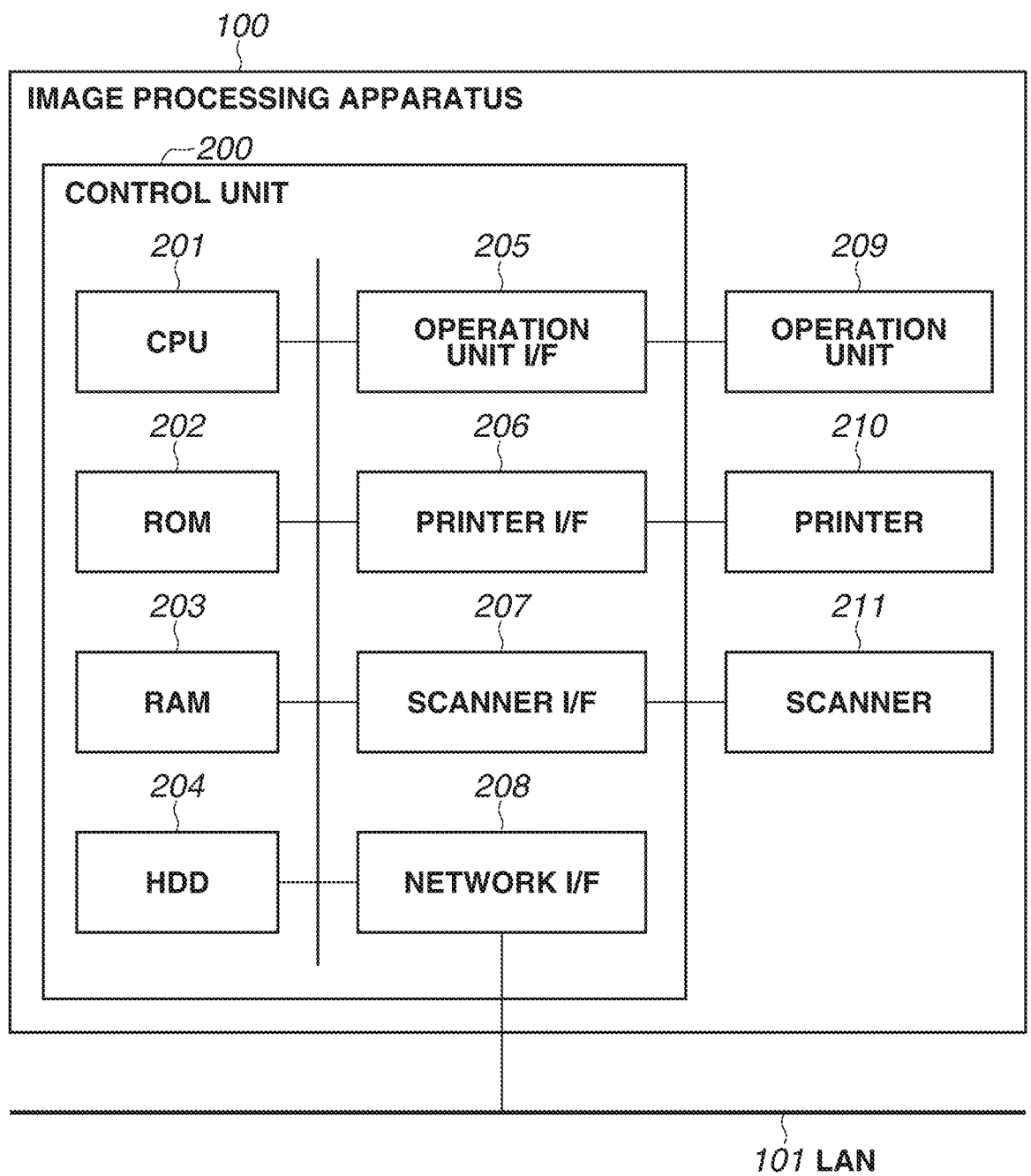
FIG. 2 is a block diagram illustrating a hardware configuration of an image processing apparatus.

FIG. 2 is a block diagram illustrating a configuration of the image processing apparatus 100 according to the present exemplary embodiment. A control unit 200 including a central processing unit (CPU) 201 controls operations of the entire image processing apparatus 100. The CPU 201 reads a control program stored in a read-only memory (ROM) 202 to perform various types of control such as reading control and transmission control. The ROM 202 is a boot ROM to store a system boot program. A random-access memory (RAM) 203 is used as a main memory and a temporary storage area such as a work area of the CPU 201. A hard disk drive (HDD) 204 stores image data, various programs, and various information tables. Further, the HDD 204 can store web contents described below. An operation unit interface (I/F) 205 is an interface for connecting an operation unit 209 and the control unit 200 to each other. The operation unit 209 includes a liquid crystal display unit having a touch panel function and a keyboard. The operation unit I/F 205 is an example of a display unit.

A printer I/F 206 is an interface for connecting a printer 210 and the control unit 200 to each other. Image data to be printed by the printer 210 is transferred from the control unit 200 via the printer I/F 206 and recorded on a recording medium (on a sheet) by the printer 210.

A scanner I/F 207 is an interface for connecting a scanner 211 and the control unit 200 to each other. The scanner 211 reads an image on a document to generate image data, and inputs the image data to the control unit 200 via the scanner I/F 207.

A network I/F 208 is an interface for connecting the control unit 200 to the LAN 101. The network I/F 208 transmits and receives information to and from an external device connected to the Internet 110 via the LAN 101.

Major functions (applications) of the image processing apparatus 100 are as follows.

A "copy" function of printing at the printer 210 image data generated by the scanner 211 reading an image on a document.

A "print" function of printing image data at the printer 210 based on a print job input from an external device such as the client PC 102.

A "scan and transmit" function of transmitting, to an external device via the network I/F 208, image data generated by the scanner 211 reading an image on a document.

A "scan and save" function of saving on the HDD 204 image data generated by the scanner 211 reading an image on a document.

A "use saved file" function of printing at the printer 210 image data saved on the HDD 204 or transmitting the image data to an external device via the network I/F 208.

A "browser" function of browsing, printing, and saving data stored on a web server via a web browser.

Figure 3:
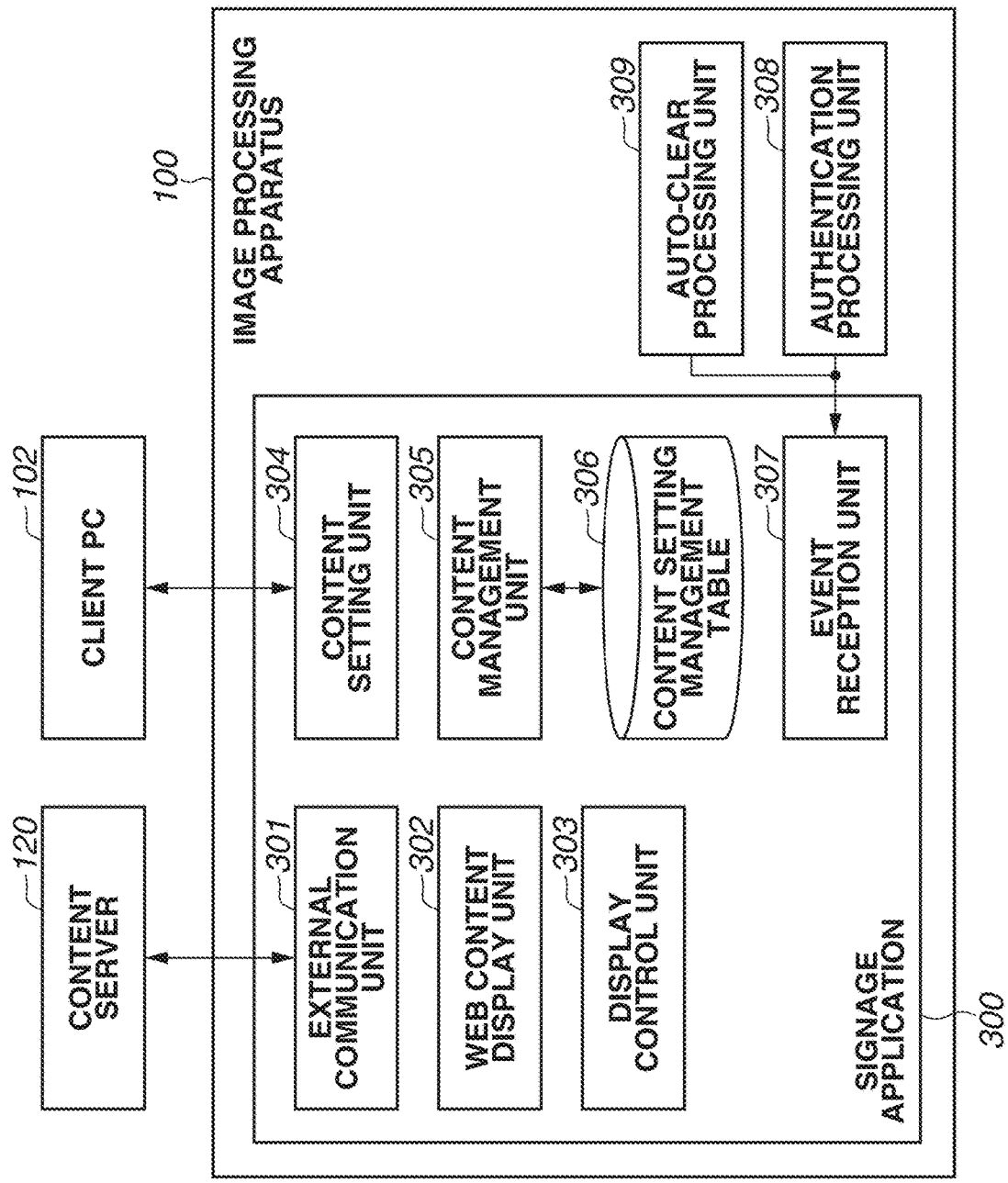
FIG. 3 is a block diagram illustrating a software configuration of the image processing apparatus.

FIG. 3 illustrates a software configuration of the entire system including the image processing apparatus 100. The CPU 201 in the image processing apparatus 100 reads and executes a control program stored in the ROM 202 or the HDD 204 to realize the functional units illustrated in FIG. 3.

The image processing apparatus 100 includes functions of a signage application 300, an authentication processing unit 308, and an auto-clear processing unit 309.

The signage application 300 is an embedded software program installed in the image processing apparatus 100. The signage application 300 includes an external communication unit 301, a web content display unit 302, a display control unit 303, a content setting unit 304, a content management unit 305, a content setting management table 306, and an event reception unit 307.

The external communication unit 301 communicates with the content server 120 to acquire web contents and a content setting management table managed by the content server 120. Communication protocols for the communication between the external communication unit 301 and the content server 120 are Server Message Block (SMB), web-based Distributed Authoring and Versioning (web DAV), and Hypertext Transfer Protocol (HTTP). Other communication protocols such as an electronic mail transmission protocol and File Transfer Protocol (FTP) may also be used.

The web content display unit 302 reads onto the RAM 203 web contents stored on the content server 120 or the HDD 204 and outputs the web contents to the operation unit 209. The term "web content" refers to data browsable by the web server such as text data, Hypertext Markup Language (HTML) data, image files (Joint Photographic Experts Group (JPEG) files, graphic interchange format (GIF) files, Portable Network Graphics (PNG) files, bitmap (BMP) files, etc.), and moving image files.

The display control unit 303 changes a screen managed for each application and outputs the screen to the operation unit 209.

The content setting unit 304 sets a web content to be displayed. More specifically, the content setting unit 304 accesses a web server of the image processing apparatus 100 using a web browser of the client PC 102 and prompts a user to set a web content to be displayed when a specific event occurs.

Figures 3A, 5:
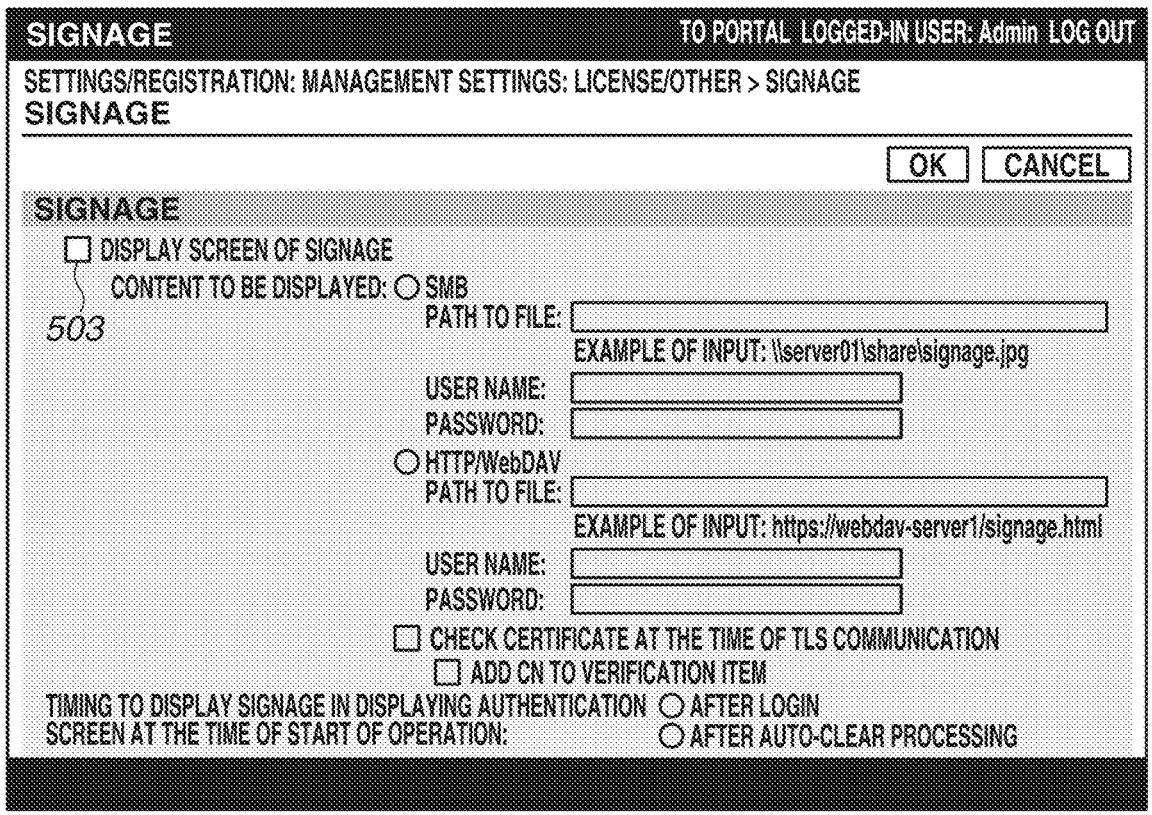
Figures 3B, 5:
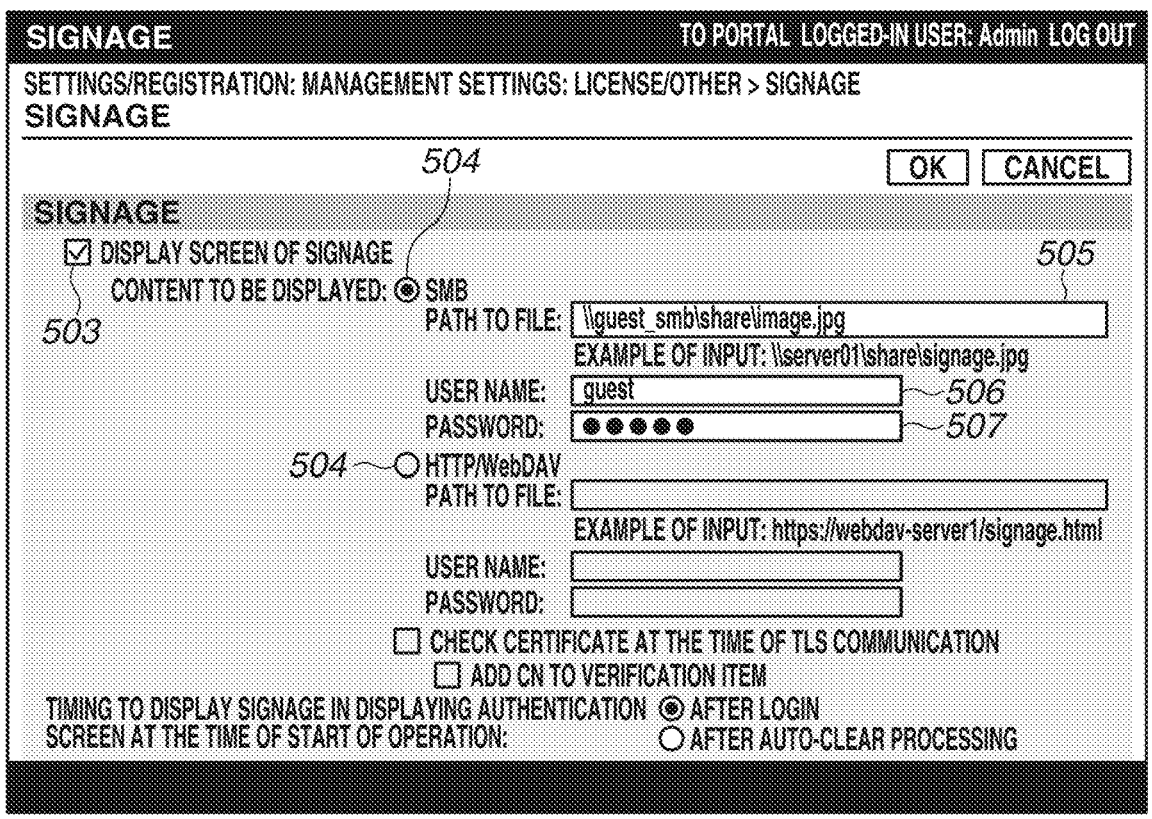
Figures 4A, 5:
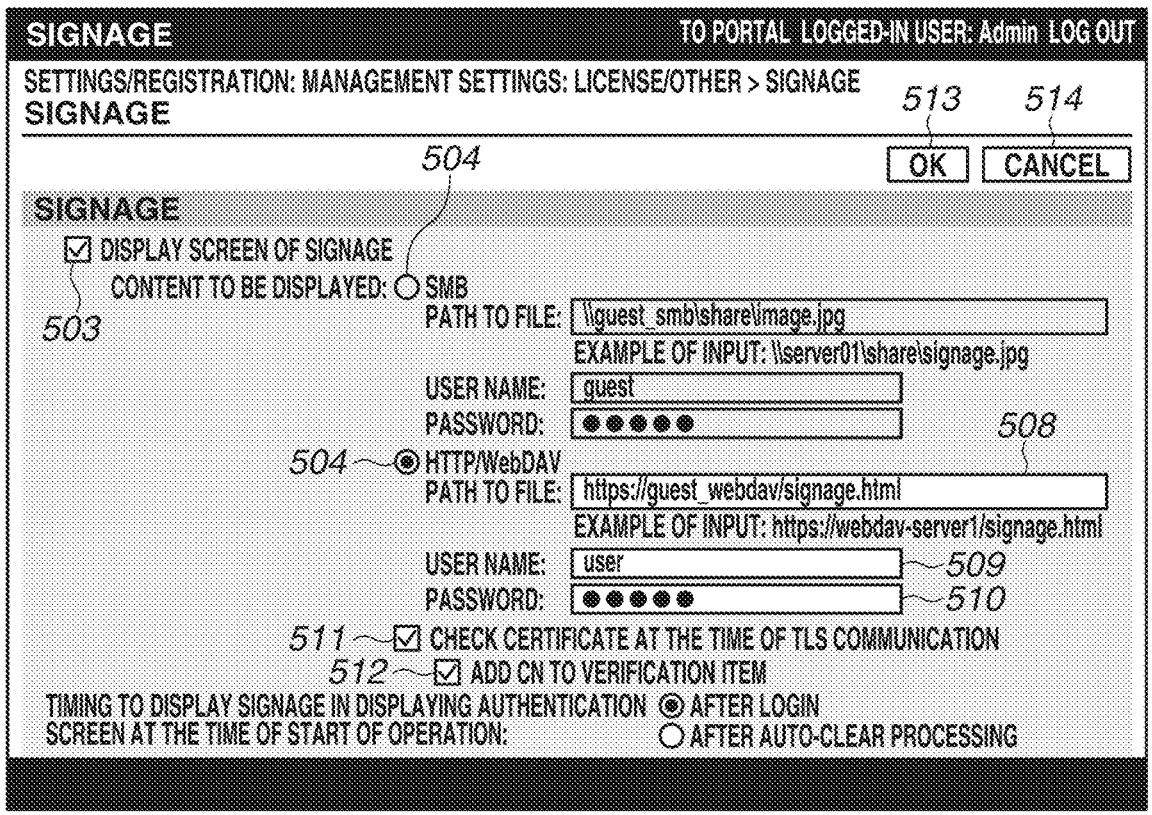
Figures 4B, 5:
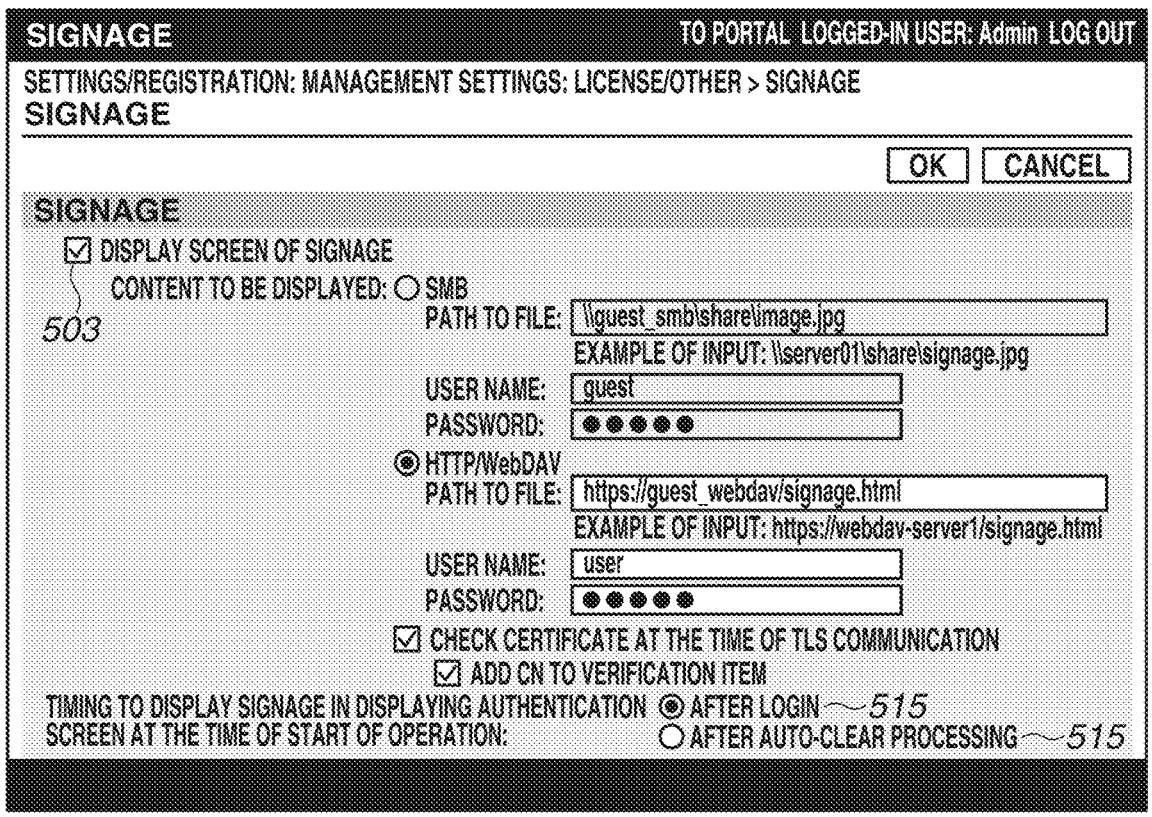

FIGS. 5-1A to 5-4B each illustrate an example of a screen for setting a web content. As described above, the content setting unit 304 accesses the web server of the image processing apparatus 100 using the web browser of the client PC 102 to display the screens.

FIG. 5-1A illustrates an example of the authentication screen for inputting authentication information. If a user inputs a user name and a password via the authentication screen and presses a login button, the authentication processing unit 308 performs user authentication and login processing. If a user having an administrator authority logs in, the screen illustrated in FIG. 5-1B is displayed.

FIG. 5-1B illustrates an example of a screen for prompting a user having an administrator authority to make various settings relating to the image processing apparatus 100. If a setting item is selected from a menu located in the left part of the screen, detailed setting items corresponding to the selected setting item is displayed at the right part of the screen. For example, if the user selects a setting item "license/other" 501, the screen illustrated in FIG. 5-2A is displayed.

FIG. 5-2A illustrates an example of a screen for making detailed settings relating to a license/other. The setting items including a setting item 502 are hyperlinks, and when a setting item is selected, a web page corresponding to the selected setting item is displayed. If the user selects the setting item 502, the setting screens for the signage application 300 as illustrated in FIGS. 5-3A and 5-3B and 5-4A and 5-4B are displayed.

On the other hand, if a user having no administrator authority logs in on the screen illustrated in FIG. 5-1A, the screen illustrated in FIG. 5-2B is displayed.

FIG. 5-2B illustrates an example of a screen for prompting a user having no administrator authority to make various settings relating to the image processing apparatus 100. The screen does not display the setting item 501, which is displayed on the screen illustrated in FIG. 5-1B, so that the user having no administrator authority cannot cause the setting screen for the signage application 300 to be displayed. In this way, the setting screen for the signage application 300 is displayed only for a user having administrator authority, so that the user allowed to set the web content settings is limited to the administrator. While the user allowed to set the web content settings is limited to the user having administrator authority to the entire image processing apparatus 100 in the present exemplary embodiment, a general user having no administrator authority may also be allowed to make the settings. Further, a unique administrator authority to the signage application 300 may be provided besides the administrator authority to the entire image processing apparatus 100 to allow only the user having the unique administrator authority to make the web content settings.

FIGS. 5-3A and 5-3B and 5-4A and 5-4B each illustrate an example of a setting screen for the signage application 300. A checkbox 503 is a setting item for switching the display of the signage application 300 to ON or OFF. When the checkbox 503 is not checked, the other setting items are shaded as illustrated in FIG. 5-3A, so that no input can be entered. On the other hand, when the checkbox 503 is checked, the settable items are displayed as illustrated in FIG. 5-3B without being shaded.

A radio button 504 is a button for selecting a communication protocol between the external communication unit 301 and the content server 120. If the radio button 504 for SMB is selected, SMB setting items are unshaded as illustrated in FIG. 5-3B, so that input can be entered to the setting items. On the other hand, if the radio button 504 for HTTP/web DAV is selected, HTTP/web DAV setting items are unshaded as illustrated in FIG. 5-4A, so that input can be entered to the setting items.

A textbox 505 is an input field for inputting a path of a web content to be displayed in the case where the communication protocol is set to SMB. The path is a character string that specifies the storage location of the web content. In the case of SMB, the path includes a computer name, folder name, file name, and the like separated by "\" (backslash). As to the web content, a file stored on the HDD 204 or a file stored on the content server 120 may be designated.

A textbox 506 is an input field for inputting a user name that is used to access the path of the web content to be displayed in the case where the communication protocol is set to SMB.

A textbox 507 is an input field for inputting a password that is used to access the path of the web content to be displayed in the case where the communication protocol is set to SMB.

A textbox 508 is an input field for inputting the path of web content to be displayed in a case where the communication protocol is set to HTTP/web DAV. In the case of HTTP/web DAV, the path includes a computer name, folder name, file name, etc. separated by "/" (slash) and specifying the storage location of the web content. As to the web content, a file stored on the HDD 204 or a file stored on the content server 120 may be designated. A textbox 509 is an input field for inputting a user name that is used to access the path of the web content to be displayed in a case where the communication protocol is set to HTTP/web DAV.

A textbox 510 is an input field for inputting a password that is used to access the path of the web content to be displayed in a case where the communication protocol is set to HTTP/web DAV.

Checkboxes 511 and 512 are setting items for inputting a setting of a case where encrypted communication is to be performed when the communication protocol is set to HTTP/web DAV.

An OK button 513 is a button for storing the set setting items 503 to 512 in the content setting management table 306 described below. If the OK button 513 is pressed, the settings of the setting items 503 to 512 are stored in the content setting management table 306, and the screen returns to the screen illustrated in FIG. 5-2A.

A cancel button 514 is a button for returning to the screen illustrated in FIG. 5-2B without storing the set setting items 503 to 512 in the content setting management table 306.

A radio button 515 is a button for setting a timing to display the web content in a case where the setting to display the authentication screen at the time of starting an operation of the image processing apparatus 100, which will be described below with reference to FIGS. 7A to 7D, is set. If the radio button 515 for "after login" is selected, the web content is displayed after a login in a case of the setting to display the authentication screen at the time of starting an operation of the image processing apparatus 100. On the other hand, if the radio button 515 for "after auto-clear" is selected, the web content is displayed after auto-clear processing in a case of the setting to display the authentication screen at the time of starting an operation of the image processing apparatus 100.

As described above, a user can set and register via the setting screens, illustrated in FIGS. 5-1A to 5-4B, identification information for identifying the web content to be displayed on the signage application 300. While the example in which the web content is set from the client PC 102 is described in the present exemplary embodiment, the setting can be made using the operation unit 209 of the image processing apparatus 100.

Referring back to FIG. 3, the content management unit 305 stores the path of the web content, etc. in the content setting management table 306 based on the details of the settings set by the content setting unit 304. Further, the content management unit 305 acquires the stored settings from the content setting management table 306 and notifies the web content display unit 302 of the acquired settings.

The content setting management table 306 is a management table for managing setting values of the signage application 300 that are set by the content setting unit 304.

FIG. 6 illustrates an example of the content setting management table 306. In FIG. 6, the content setting management table 306 generated and updated based on the contents of input entered via the setting screen illustrated in FIG. 5-4A. The content setting management table 306 may be stored on the HDD 204 of the image processing apparatus 100 or on the content server 120.

Keys 601 indicate keys that respectively correspond to the setting items of the signage application 300.

Values 602 indicate values that respectively correspond to the keys of the setting items of the signage application 300.

An item 603 indicates that the display of the signage application 300 is ON or OFF, and "0" and "1" respectively indicate "OFF" and "ON". This value is updated if the setting of the checkbox 503 in FIGS. 5-3A to 5-4B is updated.

An item 604 indicates the communication protocol used between the external communication unit 301 and the content server 120, and "0" and "1" respectively indicate "SMB" and "HTTP/web DAV". This value is updated if the setting of the radio button 504 in FIGS. 5-3A and 5-3B is updated.

An item 605 indicates the path of the web content to be displayed in a case where the communication protocol is set to SMB. This value is updated if the setting of the textbox 505 in FIGS. 5-3A to 5-4B is updated.

An item 606 indicates the user name that is used to access the path of the web content to be displayed in a case where the communication protocol is set to SMB. This value is updated if the setting of the textbox 506 in FIGS. 5-3A and 5-3B, etc. is updated.

An item 607 indicates the password that is used to access the path of the web content to be displayed in a case where the communication protocol is set to SMB. This value is updated if the setting of the textbox 507 in FIGS. 5-3A and 5-3B, etc. is updated. The same applies to FIGS. 5-4A and 5-4B.

An item 608 indicates the path of the web content to be displayed in a case where the communication protocol is set to HTTP/web DAV. This value is updated if the setting of the textbox 508 in FIGS. 5-3A and 5-3B is updated.

An item 609 indicates the user name that is used to access the path of the web content to be displayed in a case where the communication protocol is set to HTTP/web DAV. This value is updated if the setting of the textbox 509 in FIGS. 5-3A and 5-3B, etc. is updated.

An item 610 indicates the password that is used to access the path of the web content to be displayed in a case where the communication protocol is set to HTTP/web DAV. This value is updated if the setting of the textbox 510 in FIGS. 5-3A and 5-3B, etc. is updated.

Items 611 and 612 indicate the settings of a case of performing encrypted communication in a case where the communication protocol is set to HTTP/web DAV. These values are updated if the settings of the checkboxes 511 and 512 in FIGS. 5-3A and 5-3B are updated. The same applies to FIGS. 5-4A and 5-4B.

An item 613 indicates the setting of the timing to display signage in a case where the setting of displaying the authentication screen at the time of starting an operation of the image processing apparatus 100, described below with reference to FIGS. 7A to 7D, is set. This value is updated if the setting of the radio button 515 in FIGS. 5-3A, 5-3B, etc. is updated.

The content management unit 305 refers to the content setting management table 306 based on the key 601 to acquire the setting values 602 of the respective setting items.

The above-described operations common to operations in FIGS. 5-4A and 5-4B are similar.

Referring back to FIG. 3, the event reception unit 307 receives notifications of various events from the authentication processing unit 308 and the auto-clear processing unit 309.

The authentication processing unit 308 displays the authentication screen on the operation unit 209 and the client PC 102 and performs user authentication using user-input authentication information such as a user ID and a password. If the user authentication is successful, the authentication processing unit 308 performs login processing to log the user into the image processing apparatus 100. If a logout instruction is given, the authentication processing unit 308 performs logout processing to log the currently-logged-in user out of the image processing apparatus 100. A logout instruction is issued if a logout button displayed on the operation unit 209 is pressed by the user or if auto-clear processing described below is executed. If login processing or logout processing is performed, the authentication processing unit 308 transmits to the event reception unit 307 an event (login event, logout event) indicating that the login processing or logout processing is performed.

Further, the authentication processing unit 308 controls the timing to display the authentication screen based on the authentication screen display setting as described below.

The auto-clear processing unit 309 executes auto-clear processing if no operation is performed on the operation unit 209 for a predetermined time (hereinafter, the "predetermined time" will be referred to as "auto-clear transition time"). The auto-clear processing is the processing of clearing a setting value/setting state on a displayed screen to return the setting value/setting state to an initial value. For example, when a user is making a setting via a copy screen for various copy settings, if the user leaves the image processing apparatus 100 and then the auto-clear transition time passes, the setting values set partway are cleared and returned to a default setting values. The auto-clear function can prevent execution of copying with unintended settings as a result of unintentionally taking over the most recently used user setting state, prevent the next user from seeing details of the settings that are not supposed to be disclosed, or the like. If the auto-clear processing is performed, the auto-clear processing unit 309 transmits an auto-clear event to the event reception unit 307. Further, if the auto-clear processing is performed, the authentication processing unit 308 executes logout processing to log the logged-in user out. In addition, the user can set the auto-clear transition time to a desired time.

Further, the screen to be shifted to at the time of auto-clear processing can also be set. If an initial screen is set as the screen to be shifted at the time of auto-clear processing, the screen of the operation unit 209 is shifted from the currently-displayed screen to the initial screen. The initial screen is a screen that is preset by a user as a screen to be displayed at the time of activation. Examples of a screen settable as the initial screen include a main menu screen for selecting a function to be used from a plurality of functions (application or function) of the image processing apparatus 100 and application screens respectively corresponding to the functions. The following describes an example in which the initial screen is set as the screen to be shifted at the time of auto-clear processing and the main menu screen is set as the initial screen.

FIGS. 7A to 7D each illustrate an example of a screen for making user authentication settings. The screens illustrated in FIGS. 7A to 7D are screens displayable only at the time of a login of a user having administrator authority.

Figure 7A:
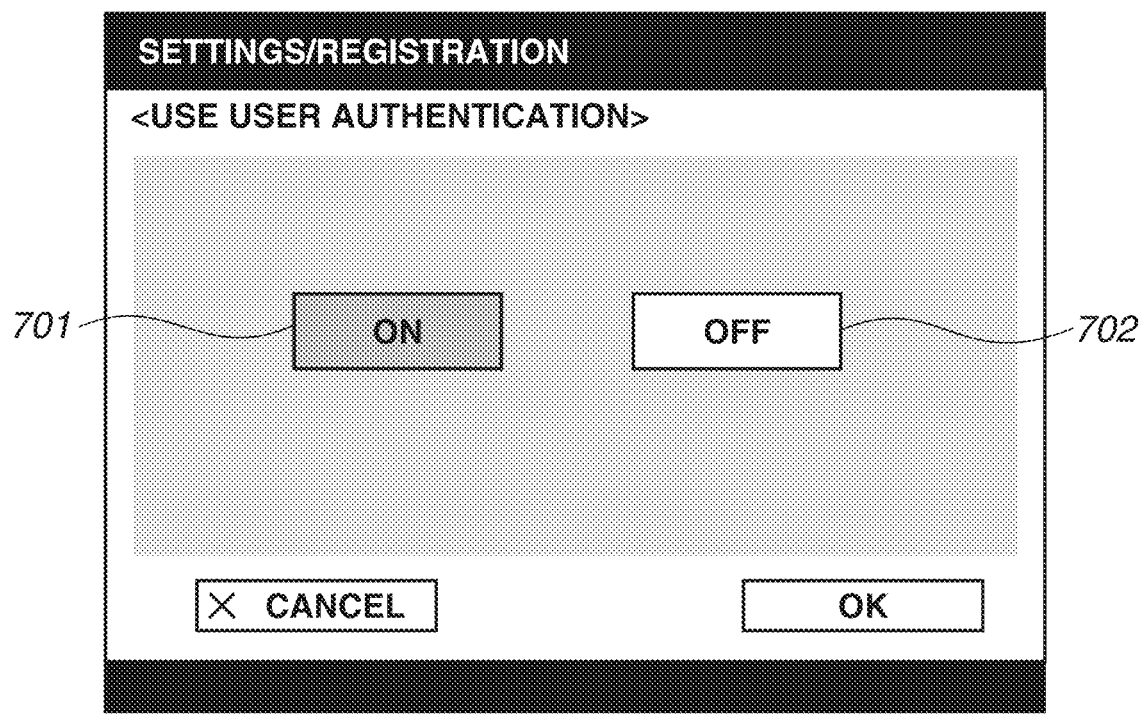
FIGS. 7A, 7B, 7C, and 7D illustrate an example of a screen for performing settings relating to user authentication.

FIG. 7A illustrates a screen for making a setting to use or not to use user authentication. A button 701 is a button for enabling user authentication, and if the button 701 is selected, the authentication screen is displayed, and the user authentication is required to use the functions of the image processing apparatus 100. A button 702 is a button for disabling user authentication, and if the button 702 is selected, the authentication screen is not displayed and the user can use the functions of the image processing apparatus 100 without user authentication.

Figure 7B:
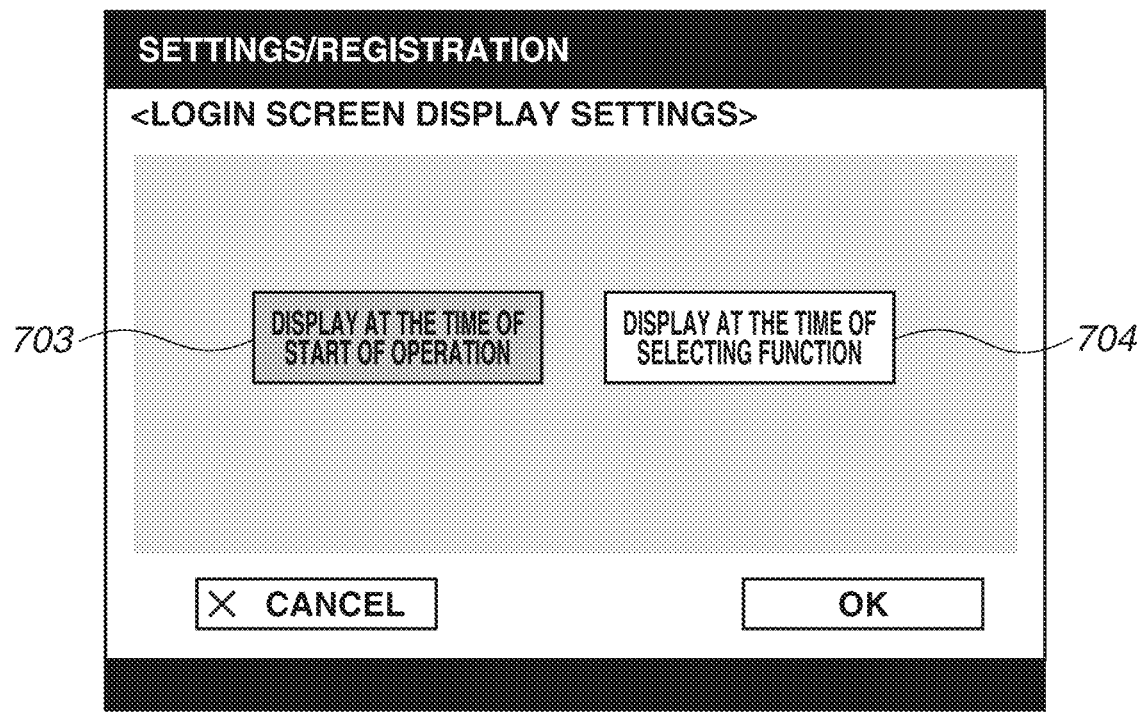
Figure 7C:
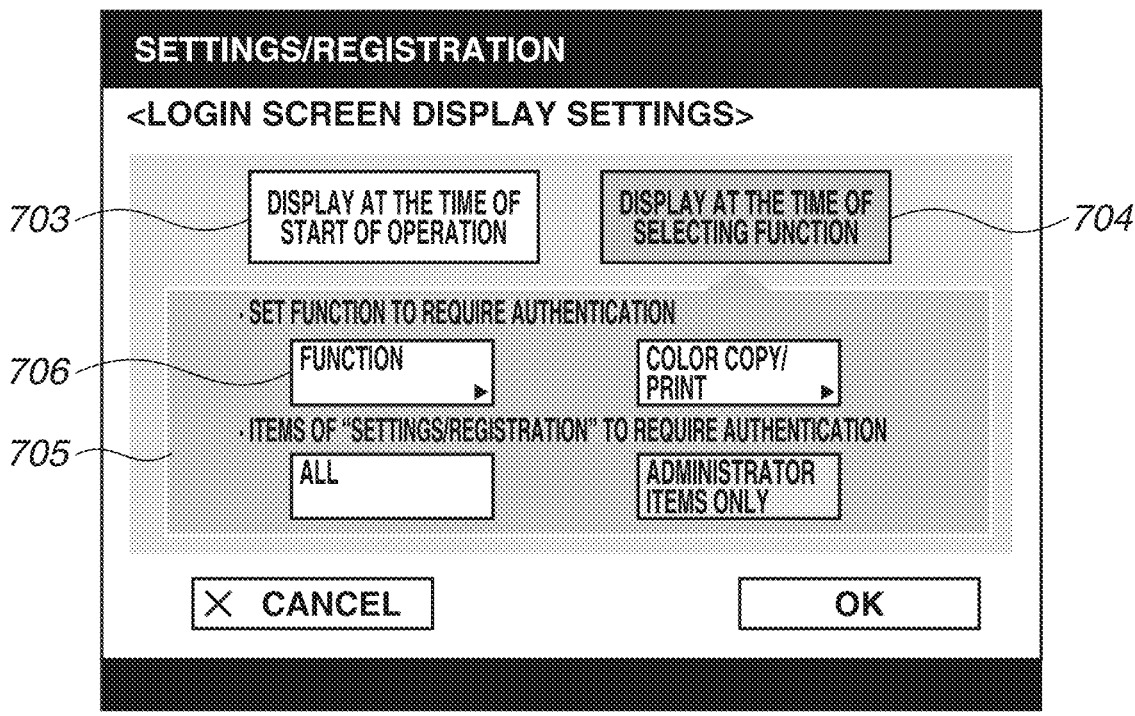

FIGS. 7B and 7C are screens for changing the display settings of the authentication screen, and the timing to perform user authentication is determined based on the settings made via the screens 7B and 7C. FIG. 7B illustrates the screen of a case where a button 703 is selected, and FIG. 7C illustrates the screen of a case where a button 704 is selected.

The button 703 is a button for making a setting to display the authentication screen at the time of starting an operation of the image processing apparatus 100, and if the button 703 is selected, the authentication screen is displayed and user authentication is required when the user is to start an operation. As a result, if the setting to display the authentication screen at the time of starting an operation is set, user authentication is required first regardless of which function the user is to use.

The button 704 is a button for making a setting to display the authentication screen when each function is selected. If the button 704 is pressed, as illustrated in FIG. 7C, a screen 705 for selecting a function to require user authentication is pop-up displayed. At this time, if a button 706 is selected, the screen is shifted to the screen illustrated in FIG. 7D.

Figure 7D:
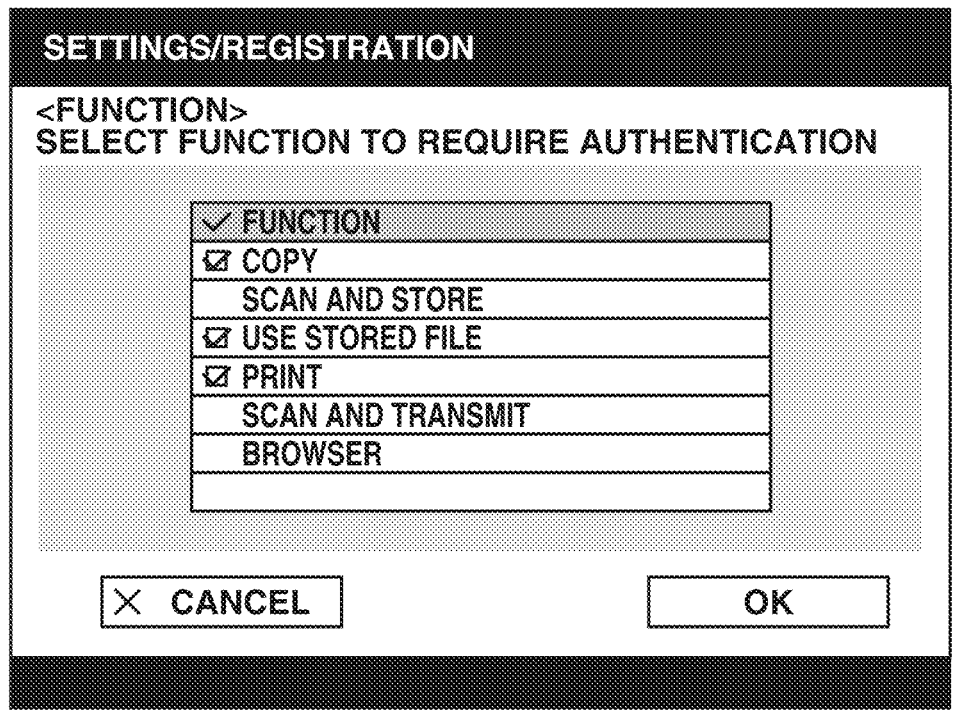

FIG. 7D illustrates a screen for selecting a function to require user authentication from the plurality of functions of the image processing apparatus 100. When a function selected via the screen illustrated in FIG. 7D as a function to require user authentication is to be used, the authentication screen is displayed. On the other hand, the functions that are not selected as a function to require user authentication are usable without user authentication. In FIG. 7D, the "copy", "use saved file", and "print" functions are selected as functions to require user authentication. On the other hand, the "scan and save", "scan and transmit", and "browser" functions are functions that do not require user authentication. As described above, in the case where the button 704 is selected, the authentication screen is not displayed at the time of starting an operation of the image processing apparatus 100, and when the user is to use a function, the authentication screen is displayed and user authentication is required depending on the selected function.

Figure 8A:
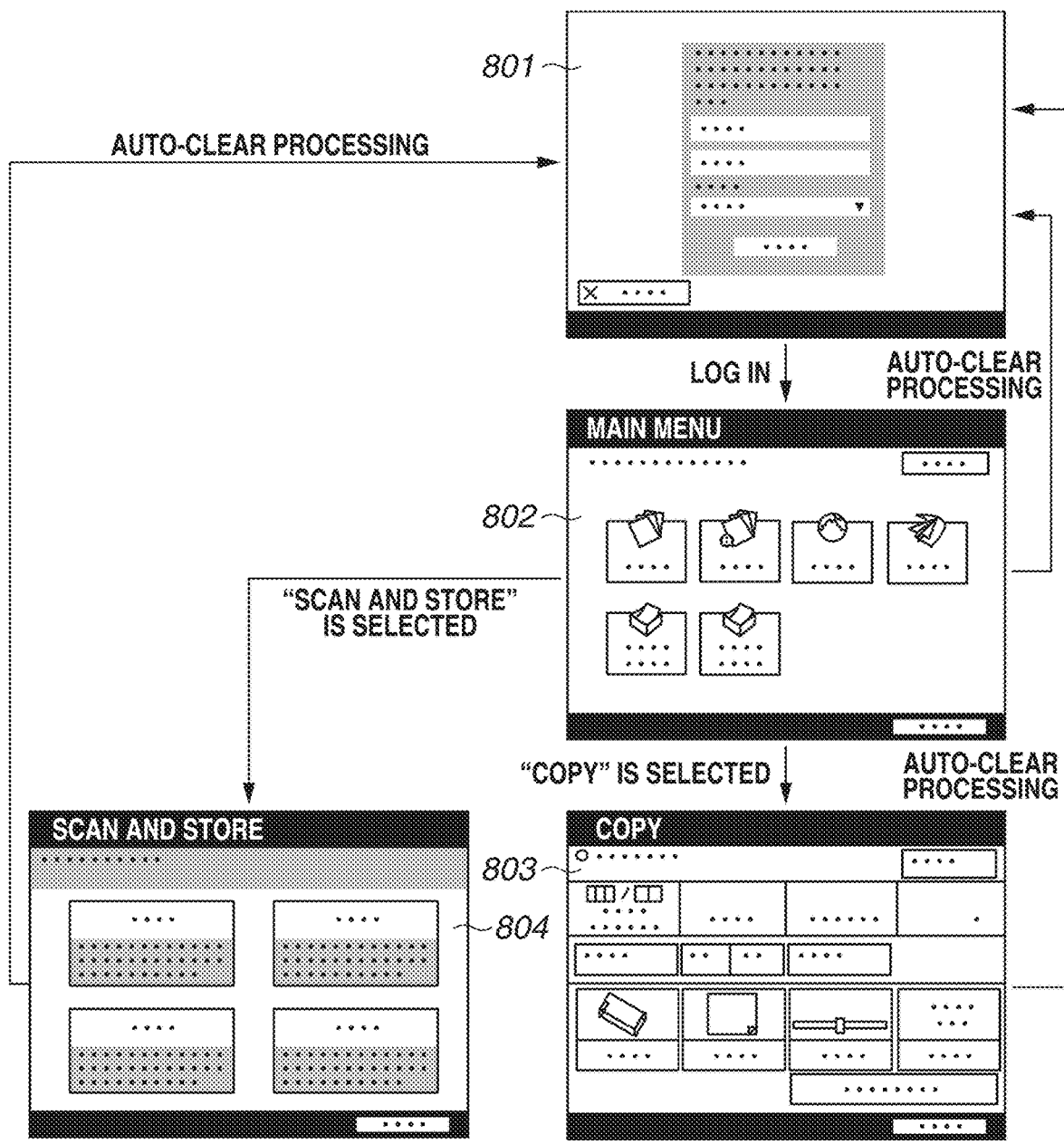
FIG. 8A illustrates a flow of screens displayed in a case where a display setting of a signage application 300 is set to OFF and a display setting of an authentication screen is set to display the authentication screen at the time of starting an operation.
Figure 8B:
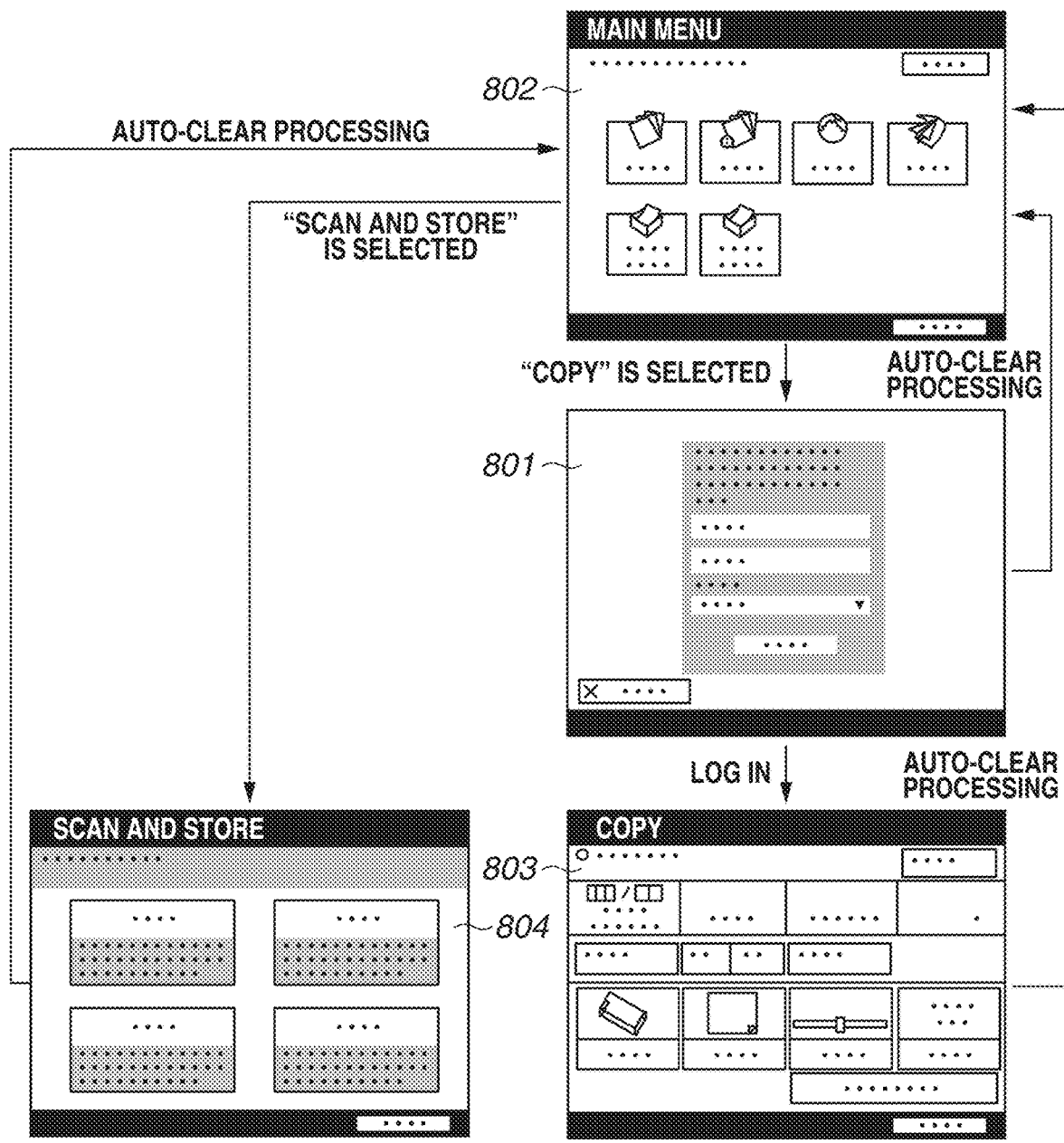
FIG. 8B illustrates a flow of screens displayed in a case where the display setting of the signage application is set to OFF and the display setting of the authentication screen is set to display the authentication screen at the time of selecting a function.
Figure 8C:
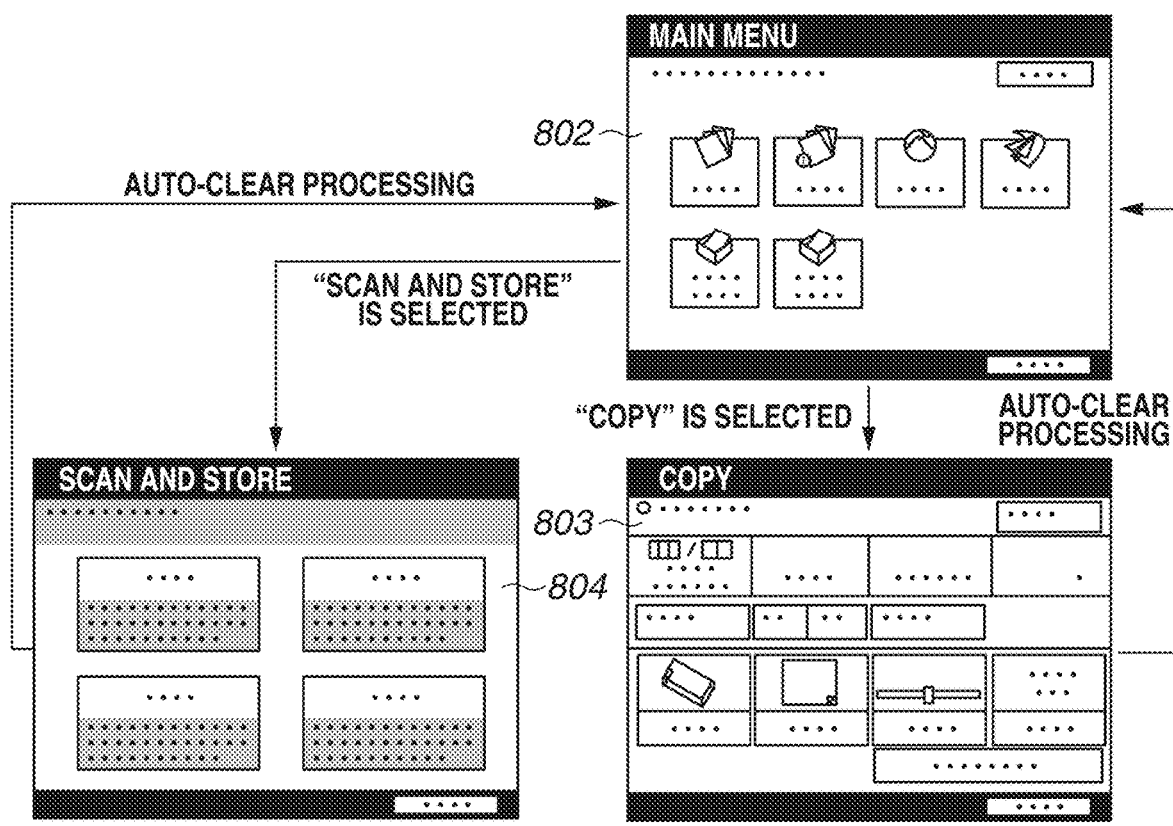
FIG. 8C illustrates a flow of screens displayed in a case where the display setting of the signage application is set to OFF and a user authentication function is set to OFF.

FIGS. 8A, 8B, and 8C each illustrate a transition of a screen to be displayed on the operation unit 209 in a case where the display of the signage application 300 is set to OFF.

FIGS. 8A and 8B illustrate a screen flow in a case where the button 701 is selected on the screen illustrated in FIG. 7A, i.e., the case where the user authentication function is set to ON.

FIG. 8A illustrates a screen flow in a case where the button 703 is selected on the screen illustrated in FIG. 7B, i.e., the case where the display setting of the authentication screen is set to display the authentication screen at the time of starting an operation. If the user turns on the image processing apparatus 100 and the image processing apparatus 100 is activated, an authentication screen 801 to which authentication information is to be input by the user is displayed first. If user authentication based on authentication information input by the user via the authentication screen 801 is successful and the login processing is completed, a main menu screen 802 for selecting a desired function from the plurality of functions of the image processing apparatus 100 is displayed. On the main menu screen 802, if the user presses a function selection button, a screen corresponding to the function is displayed. For example, if a "copy" button is selected, a copy application screen 803 for making various copy settings is displayed. Further, if a "scan and save" button is selected, a "scan and save" application screen 804 for selecting a storage destination of scanned image data is displayed. If the auto-clear transition time passes without user operation on the operation unit 209, auto-clear processing is performed. If the auto-clear processing is performed, the user is automatically logged out, and the authentication screen 801 is displayed again. For example, if the auto-clear transition time passes without user operation on the operation unit 209 while a screen 802, 803, or 804 is displayed, auto-clear processing and logout processing are performed, and the display is shifted to the display of the authentication screen 801.

FIG. 8B illustrates a screen flow in a case where the button 704 is selected on the screen illustrated in FIG. 7C, i.e., the case where the setting to display the authentication screen at the time of selecting a function is made. Further, as illustrated in FIG. 7D, the "copy", "use saved file", and "print" functions are selected as functions to require authentication. When the image processing apparatus 100 is activated and the user starts operating the operation unit 209, the main menu screen 802 is displayed first. If a function selected by the user on the main menu screen 802 is a function selected as a function to require authentication, the authentication screen 801 is displayed before the screen is shifted to the application screen corresponding to the function. For example, if the "copy" button is selected, the authentication screen 801 is displayed. If the user inputs authentication information and user authentication is successfully completed, a copy application screen 803 is displayed. On the other hand, if the function selected on the main menu screen is a function that does not require authentication, the screen is shifted to the application screen corresponding to the selected function without displaying the authentication screen. For example, if the "scan and save" button is selected, the screen 804 is displayed. Further, if the auto-clear transition time passes without user operation on the operation unit 209 and auto-clear processing is performed, the user is automatically logged out, and the screen returns to the main menu screen 802.

FIG. 8C illustrates a screen flow in a case where the button 702 is selected on the screen illustrated in FIG. 7A, i.e., the case where the user authentication function is set to OFF.

When the user turns on the image processing apparatus 100 and starts operating the operation unit 209, the main menu screen 802 is displayed first. On the main menu screen 802, if the user presses a function selection button, the application screen corresponding to the selected function is displayed. For example, if the "copy" button is selected, the screen 803 is displayed, and if the "scan and save" button is selected, the screen 804 is displayed. Further, if the auto-clear transition time passes without user operation on the operation unit 209, auto-clear processing is performed, and the screen returns to the main menu screen 802 set as the initial screen.

As described above, whether to execute user authentication is set via the screen illustrated in FIG. 7A to change the setting to display or not to display the authentication screen. Further, the timing to display the authentication screen can be changed between the time of a start of an operation and the time when a function is selected by setting the timing via the screen illustrated in FIG. 7B. Further, the screen to be displayed at the time of auto-clear processing is also changed according to the user authentication settings.

Next, the screen to be displayed on the operation unit 209 in a case where the display of the signage application 300 is set to ON will be described below.

Figure 9:
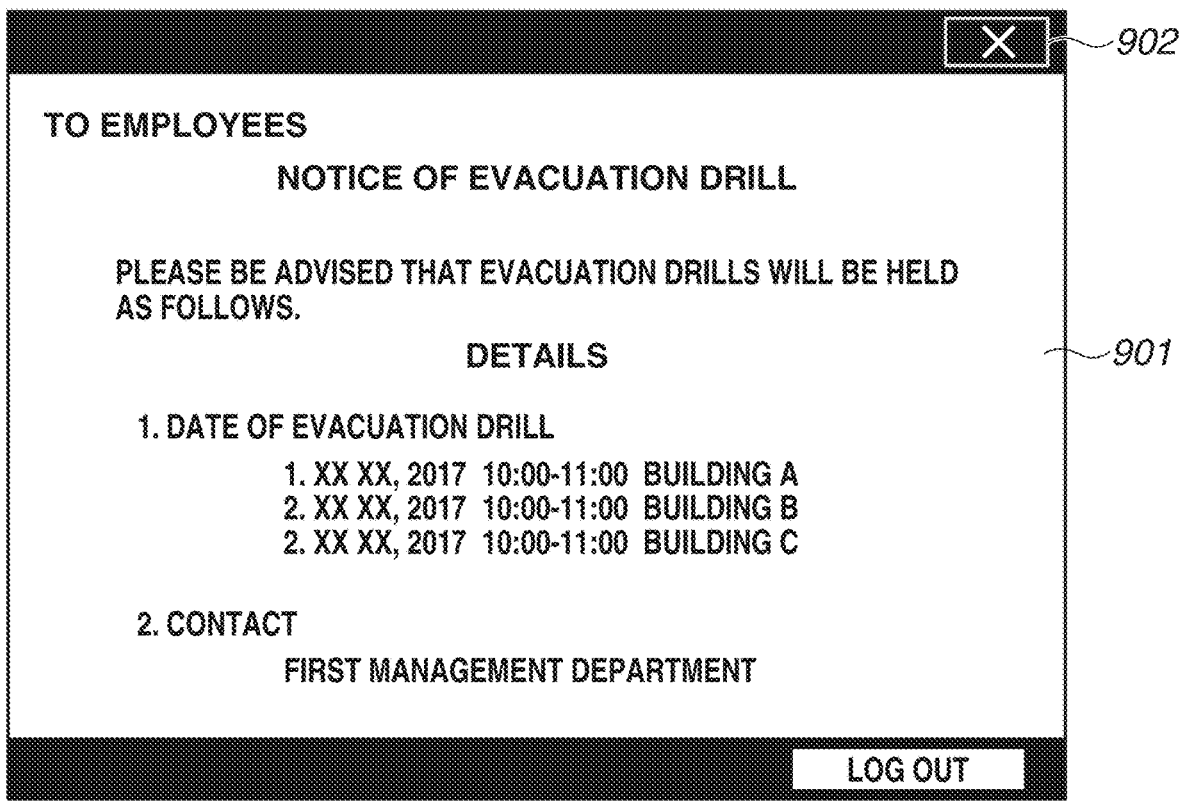
FIG. 9 illustrates an example of a screen on which a pre-registered web content is displayed through the signage application.

FIG. 9 illustrates an example of a screen at the time when a pre-registered web content is displayed by the signage application 300. A web content 901 is a display of the web content acquired from the content server 120. In FIG. 9, the HTML file specified by "https://guest_webdav/signage.html" from the content setting management table 306 in FIG. 6 is displayed. If the user presses a close button 902, the web content 901 is hidden. In FIG. 9, a notice of an emergency drill is displayed. As described above, an announcement to employees is registered as a web content, and the web content is displayed on the image processing apparatus 100 using the signage application 300 to assist the employees in sharing information, and to assist the company in controlling information, and the like.

Next, the timing to display the web content, which is a feature of the present exemplary embodiment, will be described below. As described above, the flow of screens to be displayed differs depending on the user authentication settings made via the screens illustrated in FIGS. 7A to 7D. In the present exemplary embodiment, to utilize the image processing apparatus 100 as signage, this difference in the flow of screens is taken into consideration in displaying the web content at appropriate timings according to the user authentication settings.

FIGS. 10A to 10D illustrate a flow of screens to be displayed on the operation unit 209 in a case where the display of the signage application 300 is set to ON. The screens the same as those in FIGS. 8A to 8C are given the same reference numerals to clearly indicate the differences from the screen flows illustrated in FIGS. 8A to 8C.

Figure 10A:
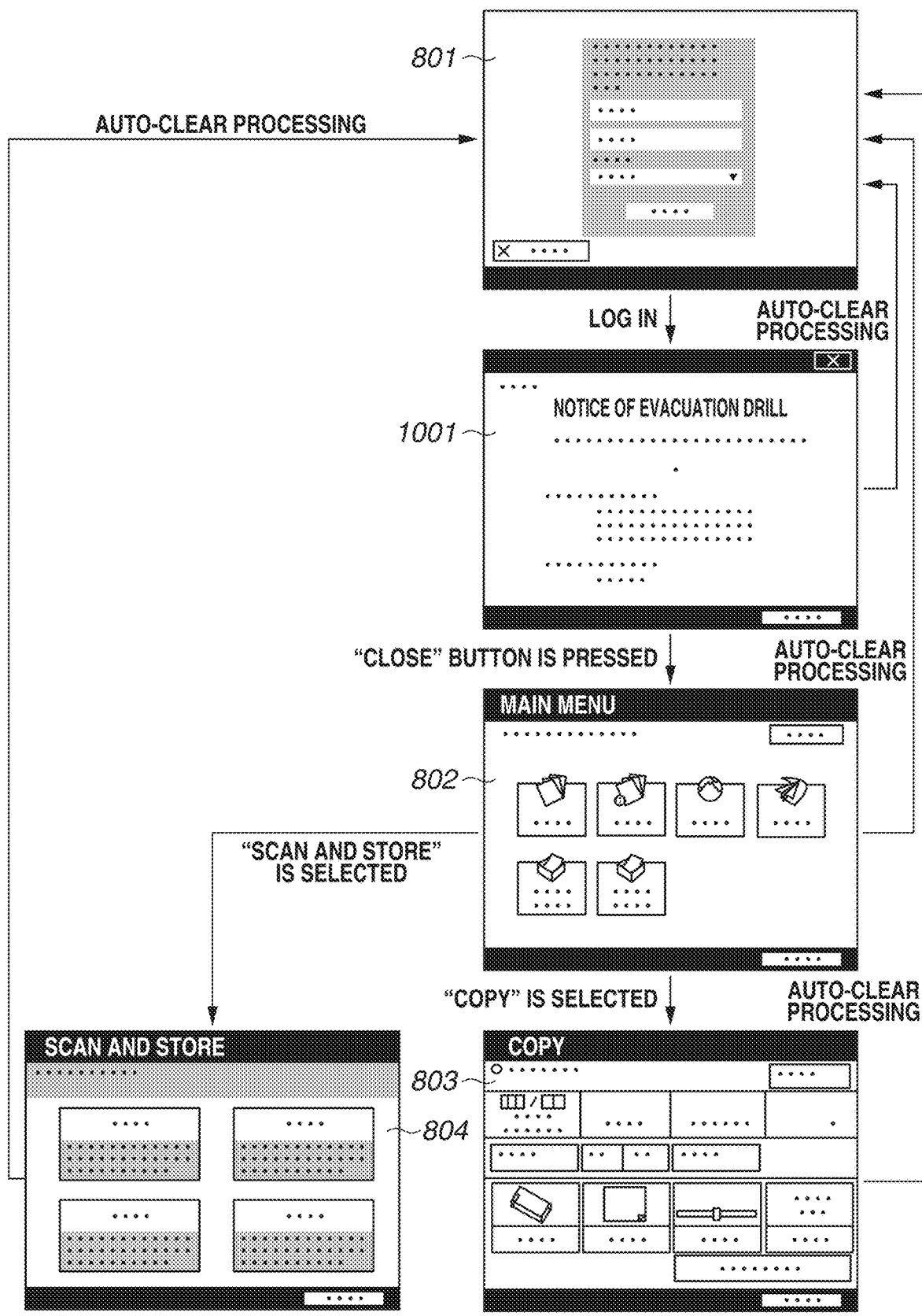
FIG. 10A illustrates a flow of screens displayed in a case where the display setting of the signage application is set to ON, the display setting of the authentication screen is set to display the authentication screen at the time of starting an operation, and a web content is to be displayed after a login.
Figure 10B:
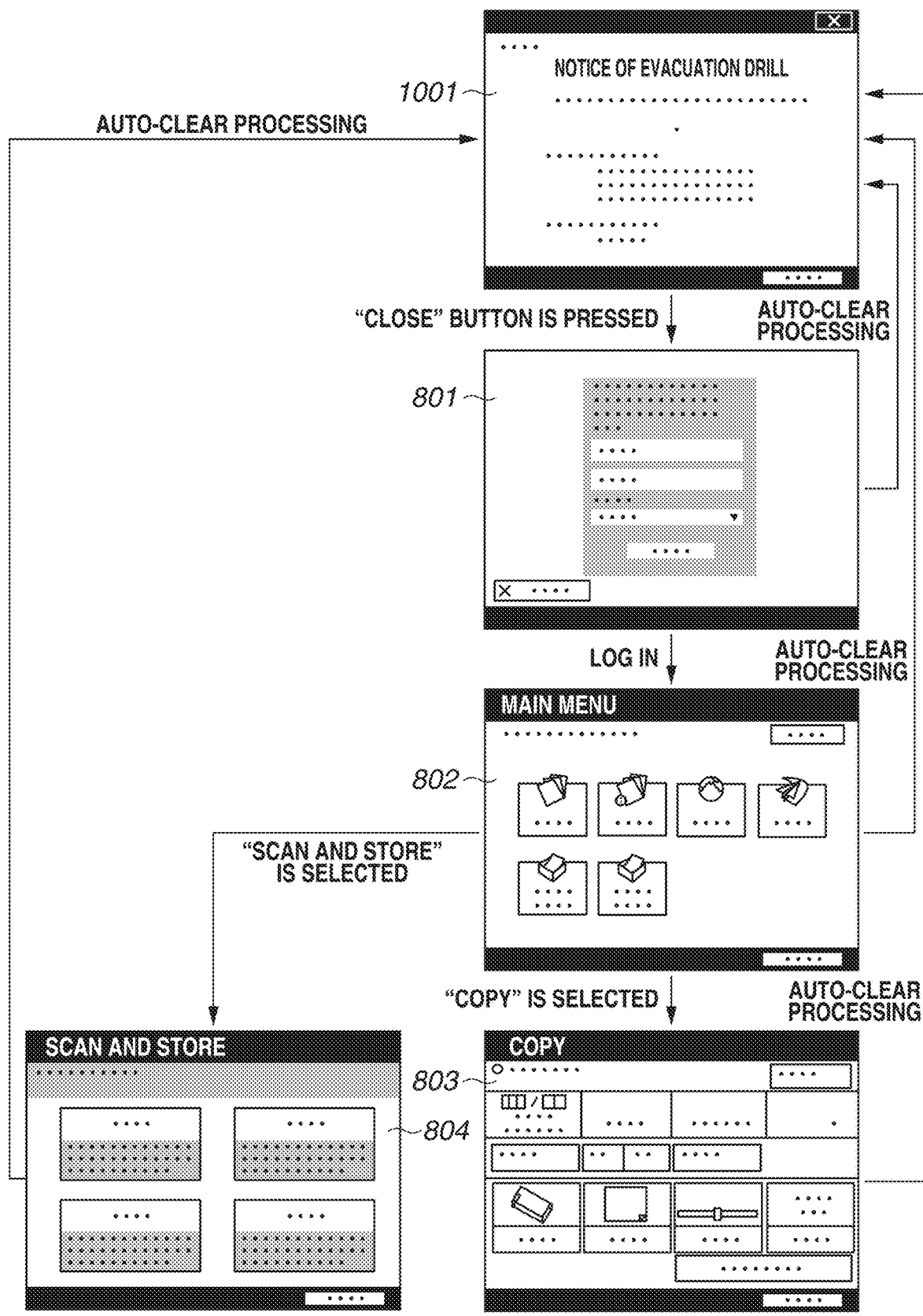
FIG. 10B illustrates a flow of screens displayed in a case where the display setting of the signage application is set to ON, the display setting of the authentication screen is set to display the authentication screen at the time of starting an operation, and a web content is to be displayed after auto-clear processing.

FIGS. 10A, 10B, and 10C illustrate a screen flow in a case where the button 701 is selected on the screen illustrated in FIG. 7A, i.e., the case where the user authentication function is set to ON.

FIG. 10A illustrates a screen flow in a case where the button 703 is selected on the screen illustrated in FIG. 7B, i.e., the case where the display setting of the authentication screen is set to display the authentication screen at the time of starting an operation. Further, the screen flow illustrated in FIG. 10A is a screen flow in a case where the radio button 515 for "after login" is selected on the screen illustrated in FIG. 5-4B. Compared to FIG. 8A, if user authentication based on authentication information input by the user via the authentication screen 801 is successful and login processing is completed, a screen 1001 of the signage application 300 is displayed. The screen 1001 is the same screen as the screen illustrated in FIG. 9. At this time, if a close button is pressed, the screen 1001 is hidden, and the main menu screen 802 is displayed.

As described above, in a case where the display setting of the authentication screen is set to display the authentication screen at the time of starting an operation and the setting to display the web content after a login is set, the web content is displayed by the signage application 300 at the timing at which the login is completed. Thus, the web content is displayed when the user starts using the image processing apparatus 100 to draw attention from the user so that the user is effectively notified of in-house announcements, or others.

FIG. 10B illustrates a screen flow in a case where the button 703 is selected on the screen illustrated in FIG. 7B, i.e., the display setting of the authentication screen is set to display the authentication screen at the time of starting an operation. Further, the screen flow illustrated in FIG. 10B is a screen flow in a case where the radio button 515 for "after auto-clear processing" is selected on the screen illustrated in FIG. 5-4B. Compared to FIG. 8A, if the auto-clear transition time passes without user operation on the operation unit 209 and auto-clear processing is performed, the screen 1001 of the signage application 300 is displayed. Then, if the close button is pressed, the screen 1001 is hidden, and the authentication screen 801 is displayed. The screen 1001 is the same screen as the screen illustrated in FIG. 9. Further, if user authentication based on authentication information input by the user via the authentication screen 801 is successful and login processing is completed, the main menu screen 802 is displayed.

As described above, the display setting of the authentication screen is set to display the authentication screen at the time of starting an operation. Further, in a case where the setting to display the web content after an auto-clear processing is set, the following processing is performed. Specifically, the web content is displayed by the signage application 300 at the timing at which auto-clear processing is performed. Thus, the web content is displayed before the user operates the image processing apparatus 100, so that even a user who passes by the image processing apparatus 100 without an intention to operate the image processing apparatus 100 is to have more opportunities to see the web content. As a result, a high publication effect can be expected.

FIG. 10C illustrates a screen flow in a case where the button 704 is selected on the screen illustrated in FIG. 7C, i.e., the case where the setting to display the authentication screen at the time of selecting a function is set. Further, as illustrated in FIG. 7D, the "copy", "use saved file", and "print" functions are selected as functions to require authentication.

In this case, no screen of the signage application 300 is displayed even if user authentication and login processing based on information input via the authentication screen 801 are completed. Instead, if the auto-clear transition time passes without user operation on the operation unit 209 and auto-clear processing is performed, the screen 1001 of the signage application 300 is displayed. Then, if the close button is pressed, the screen 1001 is hidden, and the main menu screen 802 is displayed.

As described above, in the case where the setting to display the authentication screen at the time of selecting a function is set via the screen illustrated in FIG. 7B, a web content is displayed not at the timing at which the user logs in but at the timing at which auto-clear processing occurs. Even if a web content is to be displayed at the timing of a login as in the case where the display setting of the authentication screen is set to display the authentication screen at the time of starting an operation, a web content is displayed if a function that requires user authentication is selected by the user. On the other hand, if a function that does not require user authentication is selected, since no login is performed, a web content is not displayed. For example, a user who frequently uses the "scan and save" function but infrequently uses the "copy" function has almost no opportunities to see the web content. On the other hand, if the timing to display a web content is set to the timing at which auto-clear processing occurs, the user using the image processing apparatus 100 after auto-clear processing is to see the web content when operating the operation unit 209 for the first time. This enables use of the image processing apparatus 100 as an advertisement terminal during the standby time of the image processing apparatus 100 regardless of the functions to be used, so that the user is effectively notified of the announcements, etc.

Figure 10D:
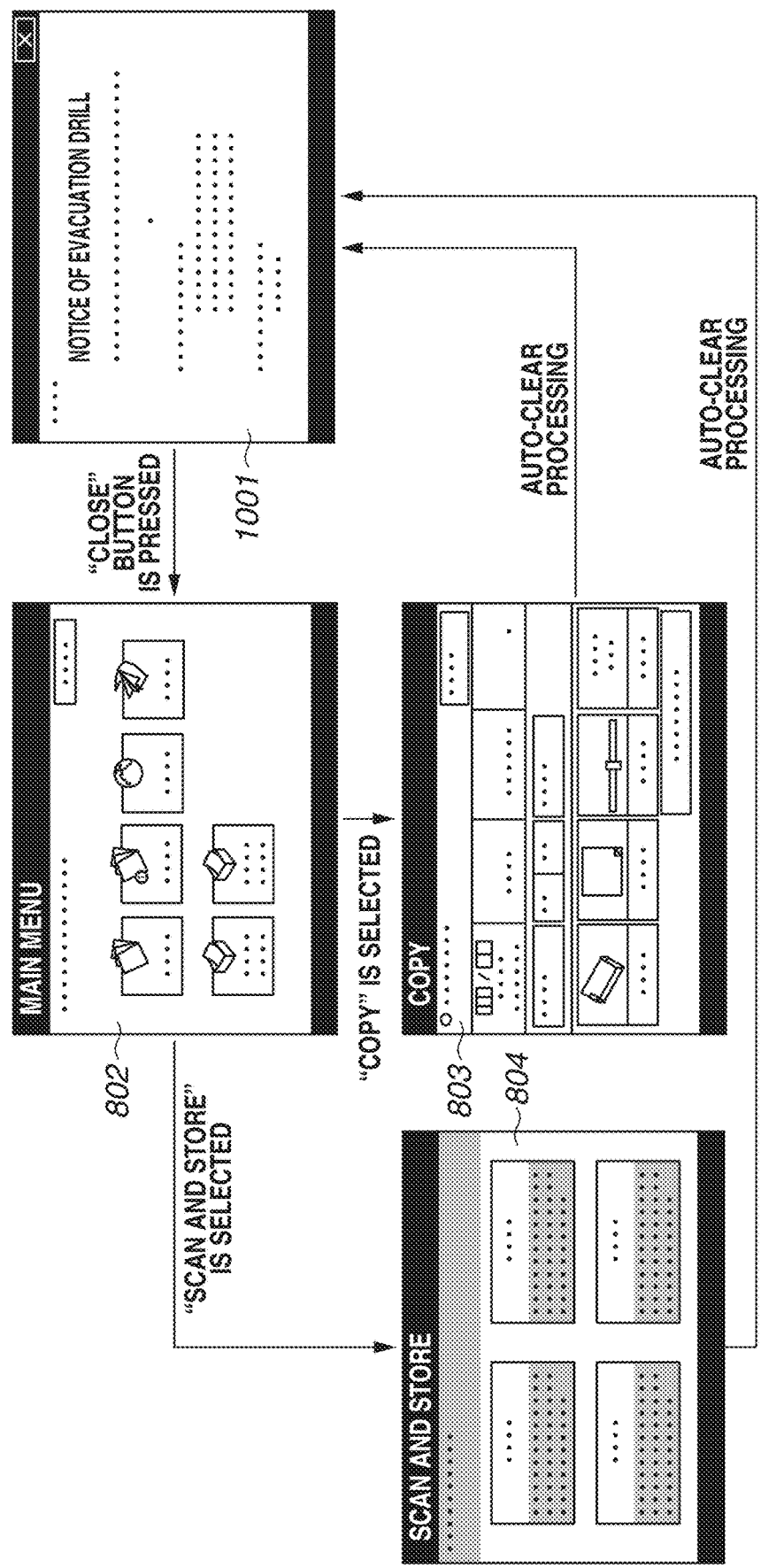
FIG. 10D illustrates a flow of screens displayed in a case where the display setting of the signage application is set to ON and the user authentication function is set to OFF.

FIG. 10D illustrates a screen flow in a case where the button 702 is selected on the screen illustrated in FIG. 7A, i.e., the case where the user authentication function is set to OFF.

In this case, as in the case of FIG. 10C, the screen 1001 of the signage application 300 is displayed at the timing at which auto-clear processing occurs.

As described above, a web content is displayed at the timing at which auto-clear processing occurs to enable effective use of the image processing apparatus 100 as signage even in a case where the setting not to use the user authentication function is set.

FIG. 4 is a flowchart illustrating a process of displaying a web content that is executed by the CPU 201.

In step S401, the CPU 201 determines whether the event reception unit 307 receives a login event or an auto-clear event from the authentication processing unit 308 or the auto-clear processing unit 309. If the CPU 201 determines that a login event or an auto-clear event is received (YES in step S401), the processing proceeds to step S402. On the other hand, if the CPU 201 determines that neither login event nor an auto-clear event is received (NO in step S401), the processing returns to step S401 to wait until an event is received.

In step S402, the CPU 201 acquires the setting value corresponding to the key 603 from the content setting management table 306 through the content management unit 305 and determines whether the display of the signage application 300 is ON. If the CPU 201 determines that the display is OFF (NO in step S402), the process is ended. On the other hand, if the CPU 201 determines that the display is ON (YES in step S402), the processing proceeds to step S403.

In step S403, the CPU 201 determines whether the event received by the event reception unit 307 in step S401 is a login event or an auto-clear event. If the CPU 201 determines that the received event is a login event (YES in step S403), the processing proceeds to step S404-1. On the other hand, if the CPU 201 determines that the received event is an auto-clear event (NO in step S403), the processing proceeds to step S404-2.

In step S404-1, the CPU 201 determines whether the authentication screen display setting is set to display the authentication screen at the time of starting an operation by the authentication processing unit 308. If the CPU 201 determines that the authentication screen display setting is not set to display the authentication screen at the time of starting an operation, i.e., if the CPU 201 determines that the authentication screen display setting is set to display the authentication screen at the time of selecting a function is set (NO in step S404-1), the process is ended. On the other hand, if the CPU 201 determines that the authentication screen display setting is set to display the authentication screen at the time of starting an operation (YES in step S404-1), the processing proceeds to step S411.

In step S411, the CPU 201 acquires the setting value corresponding to the key 613 from the content setting management table 306 through the content management unit 305 and determines whether the timing to display a web content is after a login. If the CPU 201 determines that the timing to display the web content is after a login (YES in step S411), the processing proceeds to step S406. On the other hand, if the CPU 201 determines that the timing to display the web content is not after a login (NO in step S411), the process is ended.

In step S404-2, the CPU 201 determines whether the authentication screen display setting is set to display the authentication screen at the time of starting an operation by the authentication processing unit 308. If the CPU 201 determines that the authentication screen display setting is not set to display the authentication screen at the time of starting an operation, i.e., if the CPU 201 determines that the authentication screen display setting is set to display the authentication screen at the time of selecting a function is set (NO in step S404-2), the processing proceeds to step S405. On the other hand, if the CPU 201 determines that the authentication screen display setting is set to display the authentication screen at the time of starting an operation (YES in step S404-2), the processing proceeds to step S412.

In step S405, the CPU 201 determines whether the authentication screen display setting is set to display the authentication screen at the time of selecting a function by the authentication processing unit 308 or whether user authentication is disabled. If the CPU 201 determines that the authentication screen display setting is not set to display the authentication screen at the time of selecting a function, i.e., that the authentication screen display setting is set to display the authentication screen at the time of starting an operation, or user authentication is enabled (NO in step S405), the process is ended. On the other hand, if the CPU 201 determines that the authentication screen display setting is set to display the authentication screen at the time of selecting a function or user authentication is disabled (YES in step S405), the processing proceeds to step S406.

In step S412, the CPU 201 acquires the setting value corresponding to the key 613 from the content setting management table 306 through the content management unit 305 and determines whether the timing to display a web content is after auto-clear processing. If the CPU 201 determines that the timing to display the web content is after auto-clear processing (YES in step S412), the processing proceeds to step S406. On the other hand, if the CPU 201 determines that the timing to display the web content is not after auto-clear processing (NO in step S412), the process is ended.

In step S406, the CPU 201 refers to the content setting management table 306 through the content management unit 305 to acquire a web content path and notifies the web content display unit 302 of the acquired web content path.

In step S407, the CPU 201 acquires the web content from the content server 120 through the web content display unit 302 based on the path acquired in step S402 and reads the acquired web content onto the RAM 203.

In step S408, the CPU 201 causes the display control unit 303 to change the display to the screen of the signage application 300. To the screen of the signage application 300 is output the web content acquired in step S407 from the web content display unit 302, and the web content is displayed on the operation unit 209.

In step S409, the CPU 201 determines whether the close button on the signage application 300 is pressed by the user via the operation unit 209. If the CPU 201 determines that the close button is pressed (YES in step S409), the processing proceeds to step S410. On the other hand, if the CPU 201 determines that the close button is not pressed (NO in step S409), the processing returns to step S409.

In step S410, the CPU 201 causes the display control unit 303 to hide the screen of the signage application 300.

As described above, the image processing apparatus 100 according to the present exemplary embodiment registers web content to be displayed to enable displaying the registered web content at a timing at which a specific event occurs. Especially, the timing to display the signage application 300 is determined based on the user authentication settings to provide information to the user at an appropriate timing, so that the information can be delivered to the user more effectively. More specifically, in a case of the setting to display the authentication screen at the time of starting an operation, i.e., the setting that requires user authentication to use any one of the functions, the web content is displayed at the timing at which a user login is completed. In this way, the user using the image processing apparatus 100 is to see the web content. On the other hand, in the case of the setting to display the authentication screen at the time of selecting a function, i.e., the setting in which whether user authentication is required is determined for each function, and the setting not to execute user authentication, the web content is displayed at the timing at which auto-clear processing occurs. In this way, the next user who uses the image processing apparatus 100 after the occurrence of the auto-clear processing is to see the web content without fail. As described above, information or the like that needs to be announced to employees or the like. is pre-registered as a web content, and the timing to display the web content is changed automatically based on the user authentication settings, so that it becomes unnecessary to additionally set the display timing. Thus, user convenience is improved.

Other Exemplary Embodiments

While the example in which user authentication is performed based on a user ID and a password that are input by the user is described in the above-described exemplary embodiment, authentication information for user authentication is not limited to the above-described authentication information. Further, while the case where the authentication information is manually input by the user is described in the above-described exemplary embodiment, any other methods may be used to input authentication information. For example, a contactless communication card storing authentication information may passed over an image processing apparatus 100 so that the image processing apparatus 100 reads the authentication information to perform user authentication. Further, while the example in which the authentication processing unit 308 performs user authentication processing and then performs login processing if the authentication processing is successful is described in the above-described exemplary embodiment, the user authentication processing does not have to be performed by the image processing apparatus 100. In this case, an external authentication server is provided, and the image processing apparatus 100 transmits user-input authentication information to the authentication server so that the authentication server performs user authentication. Then, the image processing apparatus 100 receives an authentication result from the authentication server, and if the authentication is successful the image processing apparatus 100 performs user login processing.

Further, while the image processing apparatus 100 capable of switching the user authentication function between ON and OFF is described in the above-described exemplary embodiment, the user authentication function of the image processing apparatus 100 may constantly be set to ON. In this case, the timing to display the web content may be set to the timing of executing login processing or the timing of executing auto-clear processing based on whether the authentication screen display setting is set to display the authentication screen at the time of starting an operation or at the time of selecting a function. Further, while the image processing apparatus 100 capable of switching between the setting to display the authentication screen at the time of starting an operation and the setting to display the authentication screen at the time of selecting a function in the case where the user authentication function is ON is described above, the image processing apparatus 100 may be an image processing apparatus that cannot be set to display the authentication screen at the time of selecting a function. In this case, the web content display timing can be set to the timing of executing user login processing or the timing of executing auto-clear processing based on the ON/OFF setting of the user authentication function.

Further, while the timing of auto-clear processing is one of the web content display timings in the above-described exemplary embodiment, the display timing may be the timing of user logout processing.

Further, the web content display timing is controlled based on the selection of the radio button 515 illustrated in FIG. 5-4B. In this way, the web content display timing can be selected from after login processing and after auto-clear processing. For example, a content that is important and needs to be seen by everybody can be set to be displayed after login processing. On the other hand, a content that needs to be seen only when auto-clear processing occurs due to a wait for processing or the like can be set to be displayed after auto-clear processing. As described above, the administrator can freely select or change the timing to display the web content based on the details of the content.

Since logout processing is executed if the logout button is pressed by a user or if auto-clear processing is performed, after the user logs out, the next user is to see the web content at first. Thus, the web content is displayed at similar timings to those in the case where the display setting is set to display the authentication screen at the time of selecting a function or the case where user authentication is OFF, so that user convenience is improved. Further, the web content display timing in the case where the user authentication function is ON and the display setting of the authentication screen is set to display the authentication screen at the time of starting an operation may be set not to the timing at which login processing is completed but the timing at which user authentication is successfully completed.

Further, the display setting may be made to display a web content at the time of other events that occur in the image processing apparatus 100. For example, the signage application 300 may be set to be displayed at the time of printing, the time of starting execution of copying, the time of starting execution of a function (scan and transmission function) of externally transmitting image data generated by a scanner, and the time of starting execution of use of a saved file. Further, the signage application 300 may be set to be displayed when the state of the image processing apparatus 100 changes such as an occurrence of a maintenance event, e.g., when toner is used up.

As described above, the CPU 201 registers contents to be displayed on the operation unit I/F 205 of the image processing apparatus 100.

Then, the CPU 201 can set whether to display the registered content on the operation unit I/F in response to a login to the image processing apparatus 100. Further, in the case where the registered content is set to be displayed in response to a login to the image processing apparatus 100, the CPU 201 controls the processing of displaying the registered content on the operation unit I/F 205 in response to a user login.

Further, the CPU 201 made the setting to display the content registered by the CPU 201 either at the timing at which no user logs in to an image processing apparatus 101 or at the timing at which a user logs in to the image processing apparatus.

In the case where the setting to display the content registered by the CPU 201 at the timing at which no user logs in to the image processing apparatus 101 is made, the processing is as follows. Specifically, the registered content is displayed on the operation unit I/F 205 at the timing at which no user logs in. Further, in the case where the setting to display the content at the timing at which a user logs in to the image processing apparatus 100 is made, the CPU 201 controls the processing of displaying the content on the operation unit I/F 205 at the timing at the time of a user login.

In the case where the setting to display the content at the timing at which no user logs in to the image processing apparatus 100, the CPU 201 controls the processing of displaying the content on the operation unit I/F 205 in response to a user logout.

Different display timings can respectively be set to a plurality of contents.

For example, an important announcement content is displayed before a login or after a logout while a subsidiary matter content is displayed after a login, and vice versa.

For example, a subsidiary matter content may be set after auto-clear processing.

The CPU 201 can set the content display timing to the timing at which a login event occurs or the timing at which an auto-clear event occurs. Further, the CPU 201 controls the processing of displaying a content at set timings.

In the present exemplary embodiment, one of the alternative radio buttons is selected to display a content after a login or before a login. Alternatively, the two timings can independently be set to ON or OFF using checkboxes instead of the alternative choices.

The login state in the present exemplary embodiment may be a state in which predetermined user authentication processing is performed and a user displays an operation screen via an operation unit of an image forming apparatus and the image forming apparatus is locally operable. Further, the logout state may also be considered as a state in which authentication information needs to be input to the image processing apparatus 100. The timing to log out may include the above-described timing of auto-clear processing.

While the image processing apparatus 100 including the plurality of functions such as the copy function and the scanner function is described as an example in the above-described exemplary embodiment, the present invention is also applicable to an image processing apparatus including only some of the functions. Further, the present invention is also applicable to other information processing apparatuses such as personal computers, personal data assistants (PDAs), mobile phones, facsimile machines, cameras, video cameras, and other image viewers.

Further, the present invention is also realized by executing the following processing. Specifically, software (program) for realizing the functions described in the above-described exemplary embodiment is supplied to a system or apparatus via a network or various storage media, and a computer (or a CPU, micro-processing unit (MPU), etc.) of the system or apparatus reads and executes the program. In this case, the computer program and a storage medium storing the computer program constitute the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-128045, filed Jun. 29, 2017, and No. 2018-048250, filed Mar. 15, 2018, which are hereby incorporated by reference herein in their entirety.

What is claimed is:

1. An image processing apparatus, comprising:
at least one processor and at least a memory coupled to the at least one processor and having instructions stored thereon, and when executed by the at least one processor, acting as:
a registration unit configured to register a message content screen to be displayed on a display unit of the image processing apparatus;
a first display control unit configured to display a setting screen for receiving a setting to display the message content screen registered by the registration unit, the setting including a first setting to display the message content screen at a timing at which the image processing apparatus does not receive an operation for a predetermined time and a second setting to display the message content screen at a predetermined timing after login processing is complete;

a storage unit configured to store a setting received by the first display control unit;

a second display control unit configured to control processing of displaying, based on the first setting stored in the storage unit, the message content screen on the display unit at the timing at which the image processing apparatus does not receive an operation for the predetermined time; and a third display control unit configured to control processing of displaying, based on the second setting stored in the storage unit, the message content screen on the display unit at the predetermined timing after login processing is complete.

2. The image processing apparatus according to claim 1, wherein the setting screen receives a setting for displaying the message content screen and a setting for not displaying the message content screen.

3. The image processing apparatus according to claim 1, wherein the registration unit registers a path of a file for displaying the message content screen.

4. The image processing apparatus according to claim 1, wherein the message content is a web content.

5. The image processing apparatus according to claim 1, wherein an auto-clear event occurs in a case where the image processing apparatus does not receive an operation for the predetermined time.

6. The image processing apparatus according to claim 5, wherein the message content is displayed based n occurrence of the auto-clear even.

7. The image processing apparatus according to claim 1, wherein at least one processor and the at least a memory further act as:

a setting unit configured to set a user authentication function of the image processing apparatus to ON/OFF, wherein the second display control unit is configured to control processing of displaying the message content screen at the timing at which the image processing apparatus does not receive an operation for the predetermined time in a case where the first display control unit receives the second setting and the setting unit sets the user authentication function to OFF.

8. The image processing apparatus according to claim 1, wherein a content identified based on setting information registered in the image processing apparatus is displayed on the message content screen.

9. The image processing apparatus according to claim 1, wherein a timing of displaying the message content screen to be received on the setting screen is alternatively selectable.

10. A method for controlling an image processing apparatus, comprising:

registering a message content screen to be displayed on a display unit of the image processing apparatus;

displaying a setting screen for receiving a setting to display the registered message content screen, the setting including a first setting to display the message content screen at a timing at which the image processing apparatus does not receive an operation for a predetermined time and a second setting to display the message content screen at a predetermined timing after login processing is complete;

storing the setting including the first setting and the second setting;

controlling processing of displaying, based on the stored first setting, the message content on the display unit at the timing at which the image processing apparatus does not receive an operation for the predetermined time; and controlling processing of displaying, based on the stored second setting, the message content screen on the display unit at the predetermined timing after login processing is complete.

* * * * *